US008310247B2

(12) United States Patent
Ota

(10) Patent No.: US 8,310,247 B2
(45) Date of Patent: Nov. 13, 2012

(54) METHOD OF DETERMINING CONTACT POSITION IN ELECTRONIC APPARATUS

(75) Inventor: Hitoshi Ota, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 310 days.

(21) Appl. No.: 12/428,872

(22) Filed: Apr. 23, 2009

(65) Prior Publication Data
US 2009/0284270 A1 Nov. 19, 2009

(30) Foreign Application Priority Data

May 16, 2008 (JP) .................. 2008-129069

(51) Int. Cl.
*G01R 27/26* (2006.01)
(52) U.S. Cl. ............... 324/661; 345/173; 178/18.06; 178/19.03; 382/124
(58) Field of Classification Search .................. 345/173; 324/661; 178/18.06, 19.03; 382/124
See application file for complete search history.

(56) References Cited

U.S. PATENT DOCUMENTS

| 6,504,530 | B1 * | 1/2003 | Wilson et al. ............. 345/173 |
| 2005/0151065 | A1 * | 7/2005 | Min ........................ 250/214 R |

FOREIGN PATENT DOCUMENTS

| JP | A-2004-119494 | 4/2004 |
| JP | 2006040289 A * | 2/2006 |
| JP | A-2006-40289 | 2/2006 |
| JP | A-2006-189868 | 7/2006 |
| JP | A-2008-27292 | 2/2008 |

* cited by examiner

*Primary Examiner* — Richard Isla Rodas
*Assistant Examiner* — Temilade S Rhodes-Vivour
(74) *Attorney, Agent, or Firm* — Oliff & Berridge, PLC

(57) ABSTRACT

A method of determining a contact position in an electronic apparatus including capacitance sensing circuits that output capacitance measuring signals and light sensing circuits that output light measuring signals includes acquiring the capacitance measuring signals by sequentially scanning the capacitance sensing circuits, determining whether a target object is in contact with a contact surface based on the acquired capacitance measuring signals, acquiring the light measuring signals by sequentially scanning the light sensing circuits after the target object is determined to be in contact with the contact surface, and determining a position of the contact surface, with which the target object is in contact, based on the acquired light measuring signals. The acquiring of the capacitance measuring signals and the determining of whether the target object is in contact with the contact surface are repeated until the target object is determined to be in contact with the contact surface.

6 Claims, 17 Drawing Sheets

⟨ Tres: RESET PERIOD ⟩

⟨ Texp: EXPOSURE PERIOD ⟩

⟨ Tout: READ-OUT PERIOD ⟩

⟨ Tres: RESET PERIOD ⟩

⟨ Tsen: SENSING PERIOD ⟩

⟨ Tout: READ-OUT PERIOD ⟩

METHOD OF DETERMINING CONTACT POSITION IN ELECTRONIC APPARATUS

BACKGROUND

1. Technical Field

The present invention relates to technology for determining a contact position.

2. Related Art

Electronic apparatuses that have a function for detecting whether a target object such as a finger or a pen is in contact with a screen have been known. For example, in JP-A-2006-40289 and JP-A-2006-189868, technology for determining a contact position of a target object by measuring changes in electrostatic capacitance formed by a liquid crystal that is pinched by two electrodes facing each other has been disclosed. In addition, in JP-A-2004-119494 and JP-A-2008-27292, technology for determining a contact position of a target object by measuring changes in light intensities of light received by tight sensing circuits that are built in a display device has been disclosed.

However, in the former technology, when the target object is in contact with the display device, a substrate that pinches the electrostatic capacitors is bent. Accordingly, there is a problem that an area that is too wide may be determined as an area with which the target object is in contact. On the other hand, in the latter technology, the target object may be determined to be in contact with the display device even when the target object is positioned closely to the display device without being in contact with the display device. Accordingly, there is a problem that the contact position of the target object may be determined incorrectly.

SUMMARY

An advantage of some aspects of the invention is that it provides a method of determining a contact position with high accuracy.

According to an aspect of the invention, there is provided a method (a first method) of determining a contact position in an electronic apparatus including a plurality of capacitance sensing circuits that measures changes in capacitance and outputs capacitance measuring signals and a plurality of light sensing circuits that measures light intensities of incident light and outputs light measuring signals. The method includes: acquiring the capacitance measuring signals by sequentially scanning the plurality of capacitance sensing circuits; determining whether a target object is in contact with a contact surface based on the acquired capacitance measuring signals; acquiring the light measuring signals by sequentially scanning the plurality of light sensing circuits after the target object is determined to be in contact with the contact surface in the determining of whether the target object is in contact with the contact surface; and determining a position of the contact surface, with which the target object is in contact, based on the acquired light measuring signals. The acquiring of the capacitance measuring signals and the determining of whether the target object is in contact with the contact surface are repeated until the target object is determined to be in contact with the contact surface in the determining of whether the target object is in contact with the contact surface.

Although, in a contact detecting method of an electrostatic capacitance type, the contact of the target object with the contact surface can be accurately detected, it is difficult to determine the contact position accurately as described above. On the other hand, in a contact detecting method of an optical type, although the contact position can be determined accurately, it is difficult to accurately detect whether contact of the target object with the contact surface is made as described above. In contrast, according to the above-described method, the contact detecting method of the electrostatic capacitance type is used until the target object is detected to be in contact with the contact surface, and the contact detecting method of the optical type is used after the target object is in contact with the contact surface. Therefore, the contact position can be detected with high accuracy. In addition, according to the above-described method, scanning of the capacitance sensing circuits and scanning of the light sensing circuits are not performed simultaneously, and accordingly, the power consumption of the electronic apparatus can be reduced.

In the above-described first method, it may be configured that the process returns to the acquiring of the capacitance measuring signals when the determining of the position of the contact surface is completed. In such a case, when the contact position is determined, the electrostatic capacitance type is switched to be used again. Therefore, both a change from a non-contact state to a contact state, a change from a contact state to a non-contact state can be detected by using the method of the electrostatic capacitance type. In this method, the contact detection of the optical type may be configured to be continued when the contact of the target object is continued.

In the above-described first method, determining whether the target object is distantly positioned based on the acquired light measuring signals may be further included between the acquiring of the light measuring signals and the determining of the position of the contact surface. In such a case, when the target object is determined to be distantly positioned from the contact surface in the determining of whether the target object is distantly positioned, the process proceeds to the acquiring of the capacitance measuring signals, and when the target object is determined to be in contact with the contact surface in the determining of whether the target object is distantly positioned, the process proceeds to the determining of the position of the contact surface, and when the determining of the position of the contact surface is completed, the process returns to the acquiring of the light measuring signals. In this case, a change from a non-contact state to a contact state is detected by using a method of the capacitance detecting type, and a change from a contact state to a non-contact state is detected by using a method of the optical detecting type. Furthermore, in such a method, it is preferable that the determining of whether the target object is distantly positioned from the contact surface is comparing the light measuring signals with a reference level and determining whether the target object is distantly positioned from the contact surface based on the result of comparison.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described. However, description of known technology that is commonly used in a general liquid crystal display device such as technology for using color filters will be omitted appropriately. In descriptions below, drawings will be referred. However, the measure, the scaling ratio, and the shape shown in the figure are not necessarily the same as those of actual ones.

First Embodiment

Figure 1:
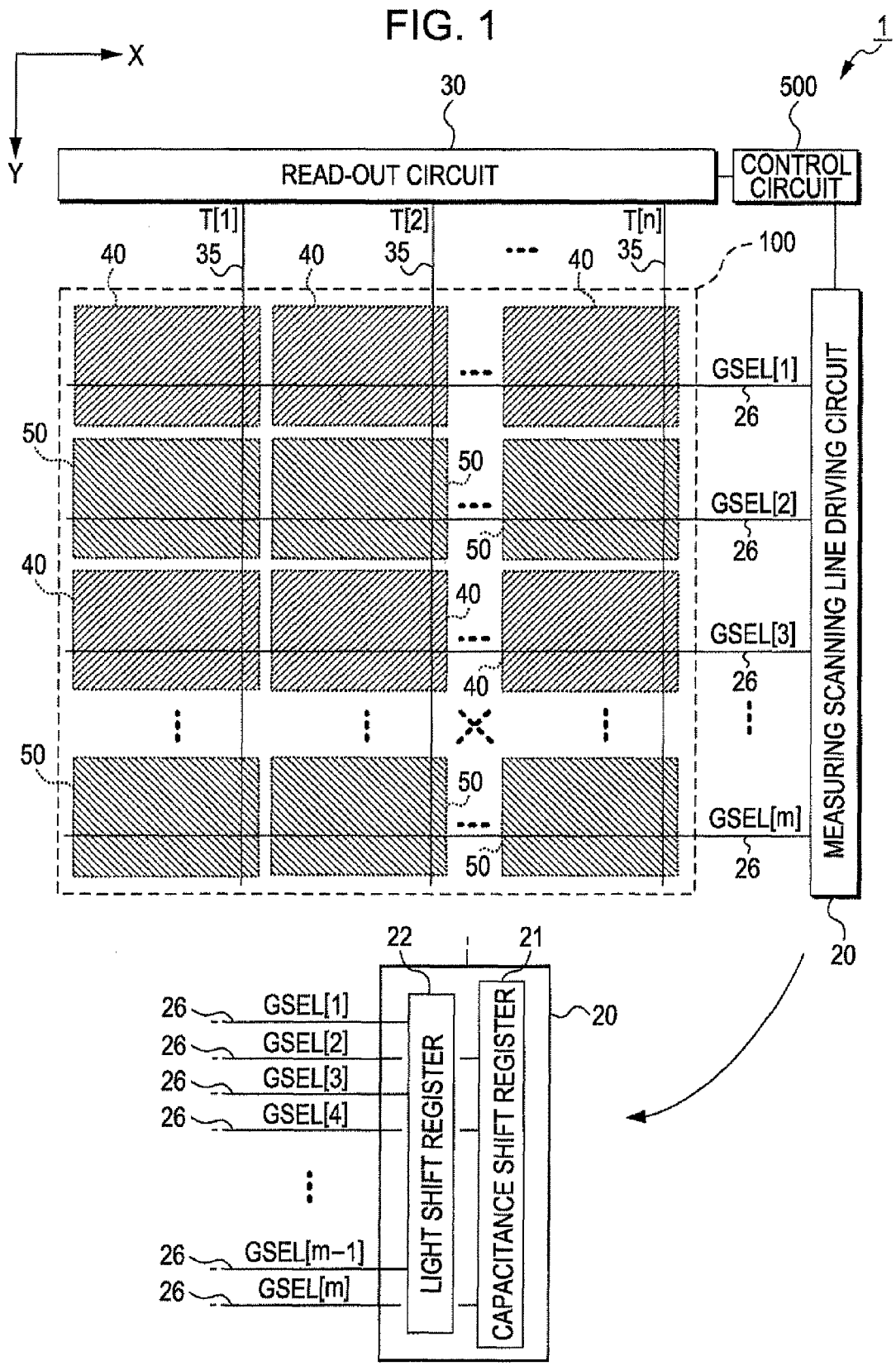
FIG. 1 is a block diagram showing the configuration of a touch panel 1 according to a first embodiment of the invention.

FIG. 1 is a block diagram showing the configuration of a touch panel (electronic apparatus) according to a first embodiment of the invention. The touch panel 1 includes a measurement area 100 in which a plurality of sensors is arranged in a face shape (in a matrix shape), a measuring scanning line driving circuit 20 that drives each sensor, a read-out circuit 30, and a control circuit 500 that controls the measuring scanning line driving circuit 20 and the reading circuit 30. The plurality of sensors includes a plurality of light sensing circuits 40 and a plurality of capacitance sensing circuits 50.

In the measurement area 100, m measuring scanning lines 26 that extend in direction X and n sense lines 35 that extend in direction Y that is perpendicular to direction X are disposed. Here, m is an even number that is equal to or larger than 2, and n is a natural number that is equal to or larger than 2. Each sensor is disposed in a position corresponding to an intersection of the measuring scanning line 26 and the sense line 35. As a result, these sensors are disposed in a matrix shape of vertical m rows×horizontal n columns.

The measuring scanning line driving circuit 20 is controlled by the control circuit 500 so as to perform scanning sensors. To be described in detail later, this scanning includes scanning of the light sensing circuit 40 and scanning of the capacitance sensing circuit 50. In each scanning operation, the measuring scanning driving circuit 20 sequentially changes a measuring scanning line 26 to be selected for each horizontal scanning period (1H). The measuring scanning driving circuit 20 selects the measuring scanning line 26 by setting an active level to a scanning signal GSEL[i] (i=1 to m) that is output to the measuring scanning line 26 to be selected. As the configuration of the measuring scanning line driving circuit 20, any arbitrary configuration may be used. However, in this embodiment, as shown in the figure, a configuration that includes capacitance shift registers 21 of m/2 stages and light shift registers 22 of m/2 stages is used. To each stage of the capacitance shift register 21, the measuring scanning line 26 of an even row is connected. In addition, to each stage of the light shift register 22, the measuring scanning line 26 of an odd row is connected.

The read-out circuit 30 reads out measurement signals T[j] (j=1 to n) from n sense lines 35 and supplies the measurement signals to the control circuit 500 under control of the control circuit 500. The measurement signal T[j] is a signal in which a light measuring signal T1[*j*] output to each of n sense lines 35 by performing a sensing process of an optical type (light scanning) is connected with a capacitance measuring signal T2[*j*] output to each of n sense lines 35 by performing electrostatic capacitance sensing process (capacitance scanning).

The control circuit 500 controls the measuring scanning driving circuit 20 so as to repeatedly perform a light scanning operation and a capacitance scanning operation and controls the read-out circuit 30 so as to read out the measurement signals T[j] (j=1 to n). In addition, the control circuit 500 acquires the measurement signals T[j] from the read-out circuit 30. When the acquired measurement signals T[j] are the capacitance measuring signals T2[*j*], the control circuit 500 determines whether a target object is brought into contact with a touch panel 1 based on the capacitance measuring signals T2[*j*]. On the other hand, when the acquired measurement signals T[j] are the light measuring signals T1[*j*], the control circuit 500 determines a contact position of the target object on a contact surface of the touch panel 1 based on the light measuring signals T1[*j*].

A plurality of the light sensing circuits 40 is disposed in positions corresponding to intersections of the measuring scanning lines 26 of odd rows and the sense lines 35, measures the light intensity of incident light, and outputs the light measuring signals T1[*j*]. In particular, the light sensing circuit 40 includes a photo diode 45 to be described later. Thus, the light sensing circuit 40 outputs a light measuring signal T1[j] that has amplitude corresponding to light intensity of light incident to the photo diode 45 to a corresponding sense line 35. To the measuring scanning lines 26 of odd rows, n light sensing circuits 40 are connected, and any capacitance sensing circuit 50 is not connected thereto.

A plurality of the capacitance sensing circuits 50 is disposed in positions corresponding to intersections of the measuring scanning lines 26 of even rows and the sense lines 35, measures changes in capacitance, and outputs the capacitance measuring signals. In particular, the capacitance sensing circuit 50 includes a contact measuring capacitance element 55. Thus, the capacitance sensing circuit 50 outputs a capacitance measuring signal T2[j] that has amplitude corresponding to a capacitance value of the contact measuring capacitance element 55 to a corresponding sense line 35. To the measuring scanning lines 26 of even rows, n capacitance sensing circuits 50 are connected, and any light sensing circuit 40 is not connected thereto. In other words, in the measurement area 100, the light sensing circuit 40 and the capacitance sensing circuit 50 are arranged alternately for each row. To n sense lines 35, m/2 light sensing circuits 40 and m/2 capacitance sensing circuits 50 that form same rows are connected.

Although not shown in the figure, the touch panel 1 includes a first substrate that extends in direction X and direction Y and a second substrate that extends in direction X and direction Y. Both substrates face each other. In addition, m measuring scanning lines 26, n sense lines 35, and sensors of m rows×n columns are disposed between both the substrates. In other words, m measuring scanning lines 26 extend along both the substrates, n sense lines 35 extend along both the substrates, and a plurality of the sensors is arranged in a face shape along both the substrates. In addition, between the substrates, a dielectric material such as a liquid crystal is pinched. This dielectric material is included in each of the plurality of the capacitance sensing circuits 50 and configures the contact measuring capacitance element 55 to be described later. As the material of both the substrates, any material may be used. However, the substrate having the contact surface needs to be formed of a transparent material.

Figure 2:
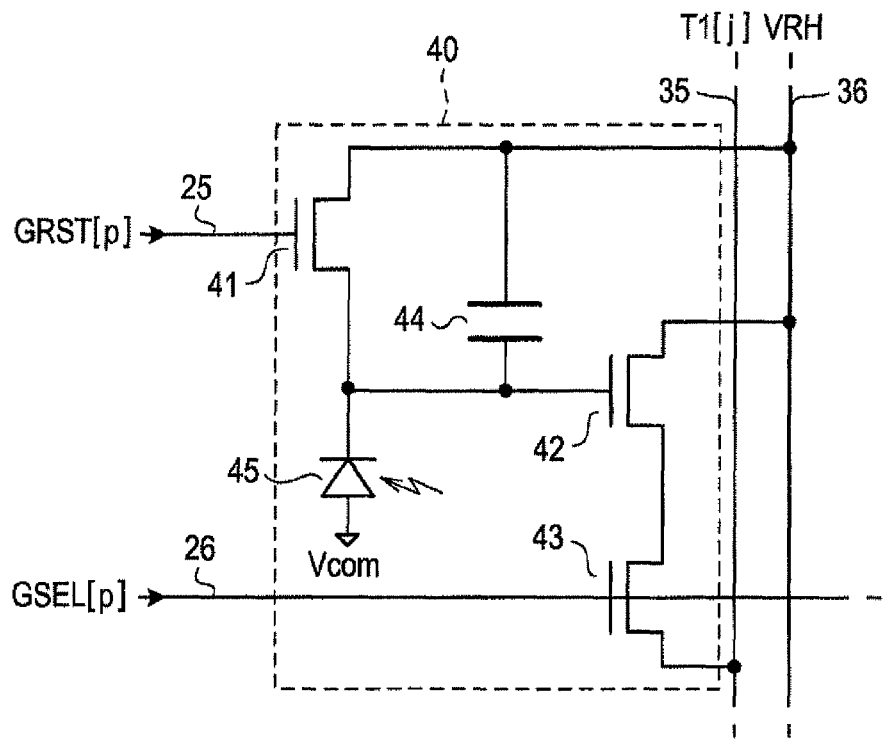
FIG. 2 is a circuit diagram showing the configuration of a light sensing circuit 40 of the touch panel 1.

FIG. 2 is a circuit diagram showing the configuration of the light sensing circuit 40. As shown in the figure, the light sensing circuit 40 includes a reset transistor 41, an amplification transistor 42, a selection transistor 43, a reference capacitance element 44, and a photo diode 45. All the reset transistor 41, the amplification transistor 42, and the selection transistor 43 are N-channel type transistors. To the anode of the photo diode 45, a common electric potential Vcom is supplied.

The drain of the reset transistor 41 is connected to a power source line 36, and the source of the reset transistor 41 is connected to the gate of the amplification transistor 42. To the power source line 36, a power source electric potential VRH is supplied. The gate of the reset transistor 41 is connected to a control line 25. This control line 25 is one of m control lines 25 that extend in direction x. When it is assumed that p is an odd number that is equal to or larger than "1" and is equal to or smaller than m, the level of a reset signal GRST[p] that is output to the control line 25 of the p-th row is set by the measuring scanning line driving circuit 20. When the reset signal GRST[P] has an active level (for example, an electric potential VD), the reset transistor 41 transits to the ON state. On the other hand, when the reset signal GRST[p] has an inactive level (for example, GND (=0 V)), the reset transistor 41 transits to the OFF state.

The drain of the amplification transistor 42 is connected to the power source line 36, and the source of the amplification transistor 42 is connected to the drain of the selection transistor 43. Between the gate of the amplification transistor 42 and the drain of the reset transistor 41, a capacitance element 44 is interposed. In addition, the gate of the amplification transistor 42 is connected to the cathode of the photo diode 45. The source of the selection transistor 43 is connected to the sense line 35, and the gate of the selection transistor 43 is connected to the measuring scanning line 26. To this measuring scanning line 26, a selection signal GSEL[p] is supplied. When the selection signal GSEL[p] has a high level, the selection transistor 43 is in the ON state. On the other hand, when the selection signal GSEL[p] has a low level, the selection transistor 43 is in the OFF state.

Figure 3:
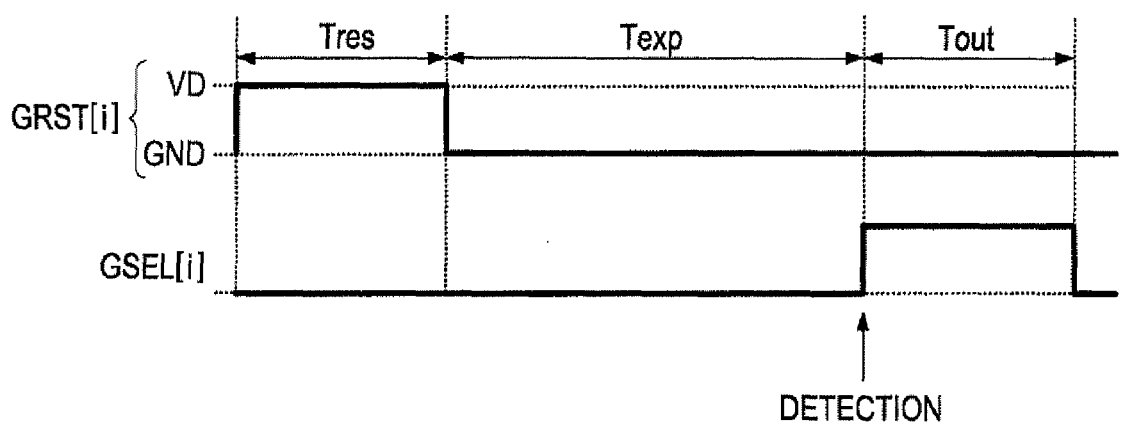
FIG. 3 is a timing chart showing the operation of the light sensing circuit 40.
Figure 4:
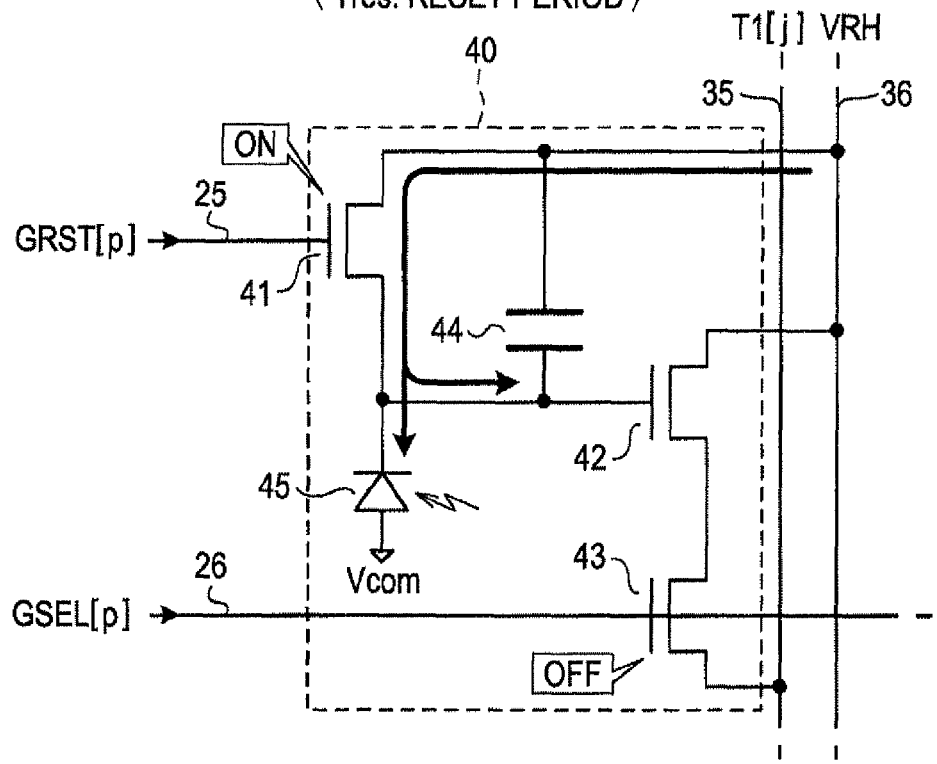
FIG. 4 is a timing chart showing the operation of the light sensing circuit 40.

As shown in FIG. 3, the light sensing circuit 40 operates in units of a reset period Tres, an exposure period Texp, and a read-out period Tout. In the reset period Tres, the level of the reset signal GRST[p] that is supplied to the control line 25 becomes the active level, and the selection signal GSEL[p] that is supplied to the measuring scanning line 26 is maintained at the low level. Accordingly, as shown in FIG. 4, during the reset period Tres, the reset transistor 41 is in the ON state, and the selection transistor 43 is in the OFF state. Therefore, the electric potential VA of the gate of the amplification transistor 42 is set (reset) to the power source electric potential VRH. In addition, the power source electric potential VRH is supplied also to the cathode of the photo diode 45, and a voltage between the anode and the cathode of the photo diode 45 is maintained to be "VRH-Vcom".

Figure 5:
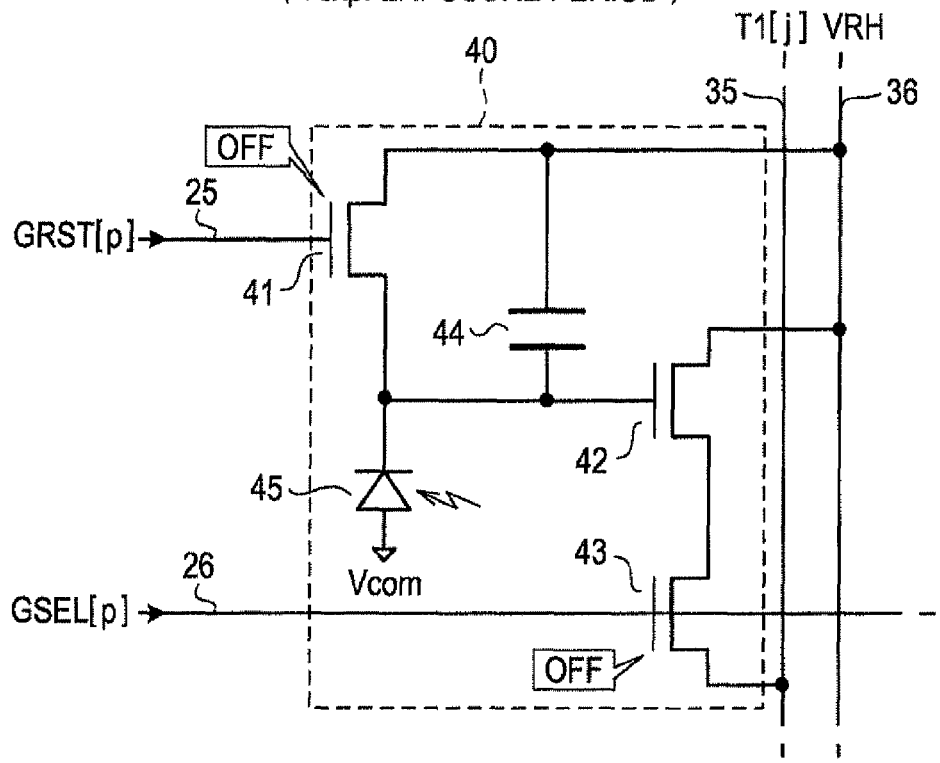
FIG. 5 is a timing chart showing the operation of the light sensing circuit 40.

As shown in FIG. 3, in the exposure period Texp following the reset period Tres, the level of the reset signal GRST[p] becomes the inactive level, and the selection signal GSEL[p] is maintained at the low level. Accordingly, as shown in FIG. 5, the reset transistor 41 transits to the OFF state, and the selection transistor 43 is maintained in the OFF state. Therefore, electric charges output from the photo diode 45 are accumulated in the capacitance element 44. As a result, when the voltage of the photo diode 45 is Vpd, the electric potential VA of the gate of the amplification transistor 42 is VA=VRH−Vpd. Vpd is determined in accordance with the light intensity of light (environmental light) incident to the photo diode 45.

Figure 6:
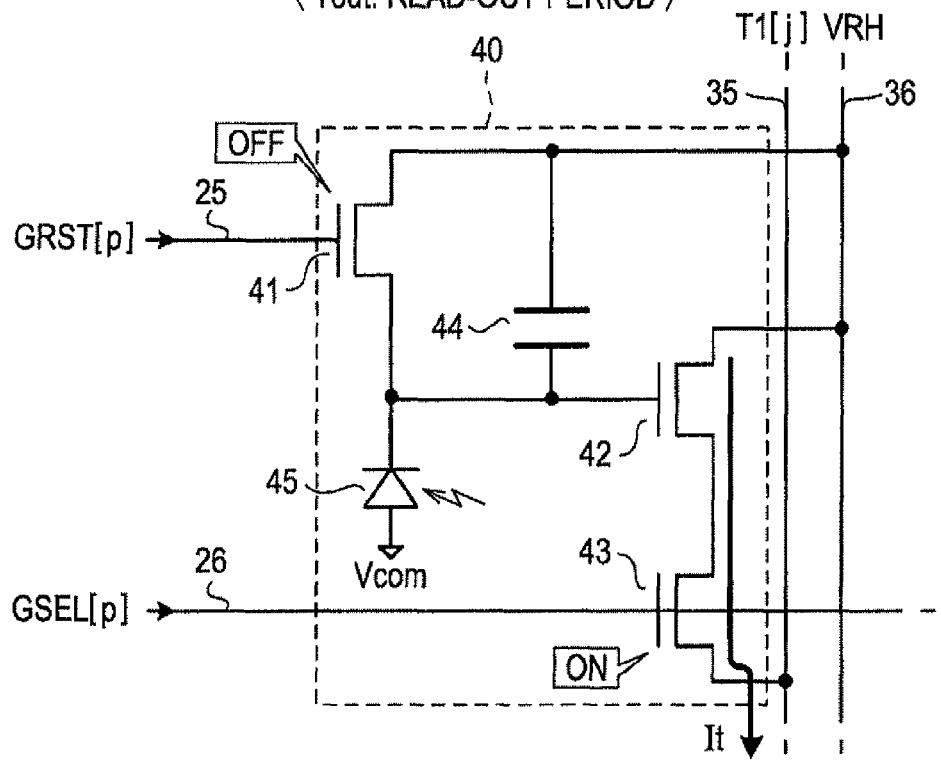
FIG. 6 is a timing chart showing the operation of the light sensing circuit 40.

As shown in FIG. 3, in the read-out period Tout following the exposure period Texp, the level of the selection signal GSEL[p] becomes the high level. Accordingly, as shown in FIG. 6, the selection transistor 43 transits to the ON state. At this moment, the reset transistor 41 is maintained in the OFF state, and accordingly, a current It having amplitude corresponding to the electric potential VA of the gate of the amplification transistor 42 flows though the sense line 35 so as to be supplied to the read-out circuit 30. Accordingly, a light measuring signal T1[j] is output.

When a target object contacts or approaches the touch panel 1 in the exposure period Texp, the light intensity of light incident to the photo diode 45 changes. When the light intensity of the light incident to the photo diode 45 changes, the electric potential VA of the gate of the amplification transistor 42 changes in accordance with the change of the light intensity. Accordingly, there is a difference between a level of the light measuring signal T1[j] that is output for a case where the target object does not contact or approach the contact surface and a level of the light measuring signal T1[j] that is output for a case where the target object contacts or approaches the contact surface. Such property is used for determining a contact position.

Figure 7:
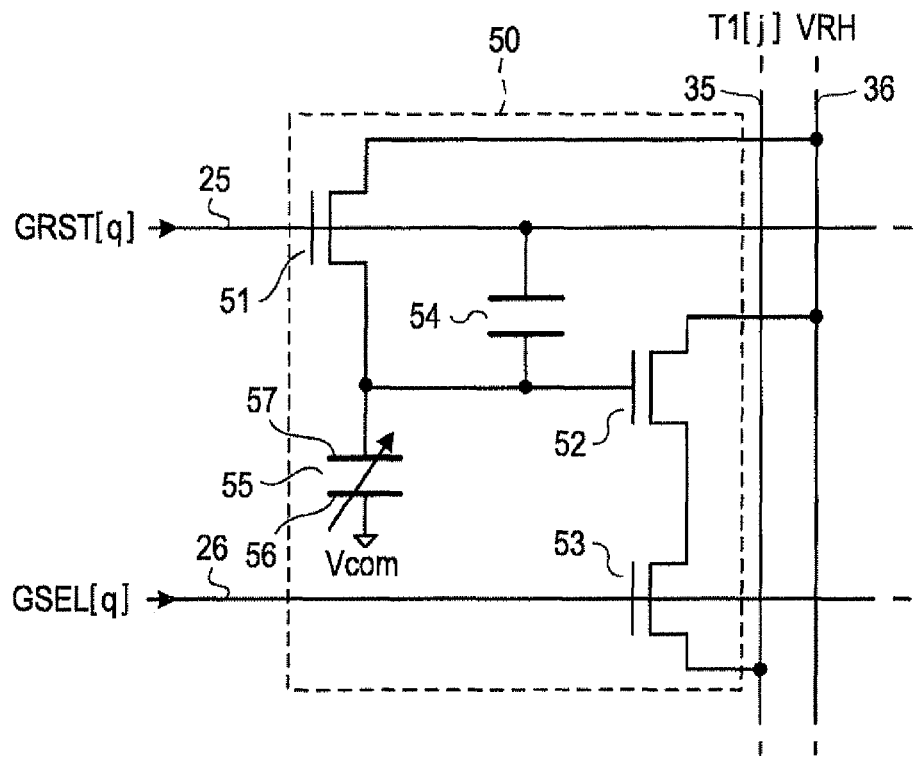
FIG. 7 is a circuit diagram showing the configuration of a capacitance sensing circuit 50 of the touch panel 1.

FIG. 7 is a circuit diagram showing the configuration of the capacitance sensing circuit 50. As shown in FIG. 7, the capacitance sensing circuit 50 includes a reset transistor 51, an amplification transistor 52, a selection transistor 53, a reference capacitance element 54, and a contact measuring capacitance element 55. All the reset transistor 51, the amplification transistor 52, and the selection transistor 53 are N-channel type transistors. The contact measuring capacitance element 55 includes a dielectric material to which an electric field that is generated between a first electrode 56 and a second electrode 57 is applied. This dielectric material is the dielectric material pinched between the first substrate and the second substrate that are described above. To the first electrode 56, a common electric potential Vcom is supplied.

The drain of the reset transistor 51 is connected to the power source line 36, and the source of the reset transistor 51 is connected to the gate of the amplification transistor 52. To the power source line 36, the power source electric potential VRH is supplied. The gate of the reset transistor 51 is connected to the control line 25. When it is assumed that q is an even number that is equal to or larger than "1" and is equal to or smaller than m, the level of a reset signal GRST[q] that is output to the control line 25 of the q-th row is set by the measuring scanning line driving circuit 20. When the reset signal GRST[q] has an active level, the reset transistor 51 transits to the ON state. On the other hand, when the reset signal GRST[q] has an inactive level, the reset transistor 51 transits to the OFF state.

The drain of the amplification transistor 52 is connected to the power source line 36, and the source of the amplification transistor 52 is connected to the drain of the selection transistor 53. Between the gate of the amplification transistor 52 and the control line 25, a reference capacitance element 54 is interposed. In addition, the gate of the amplification transistor 52 is connected to a second electrode 57 of the contact measuring capacitance element 55. The source of the selection transistor 53 is connected to the sense line 35, and the gate of the selection transistor 53 is connected to the measuring scanning line 26. To this measuring scanning line 26, a selection signal GSEL[q] is supplied. When the selection signal GSEL[q] has a high level, the selection transistor 53 is in the ON state. On the other hand, when the selection signal GSEL[q] has a low level, the selection transistor 53 is in the OFF state.

Figure 8:
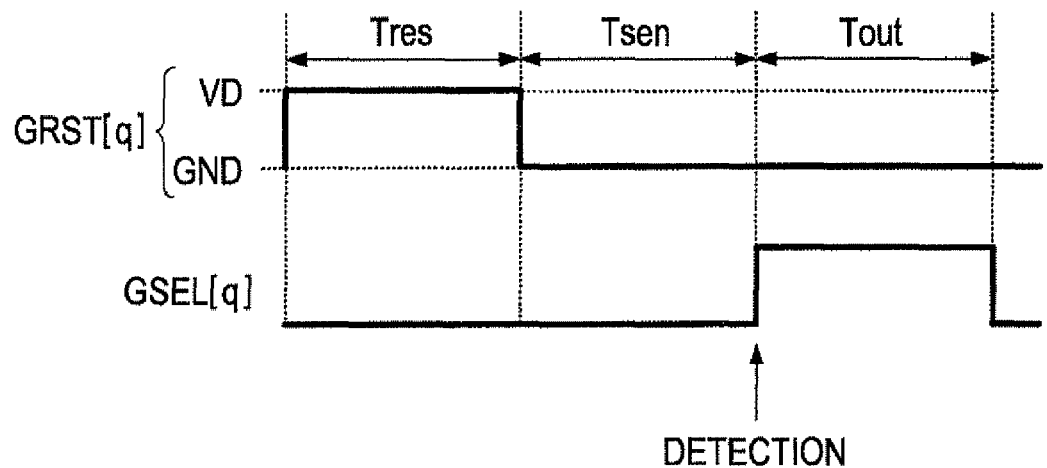
FIG. 8 is a timing chart showing the operation of the capacitance sensing circuit 50.
Figure 9:
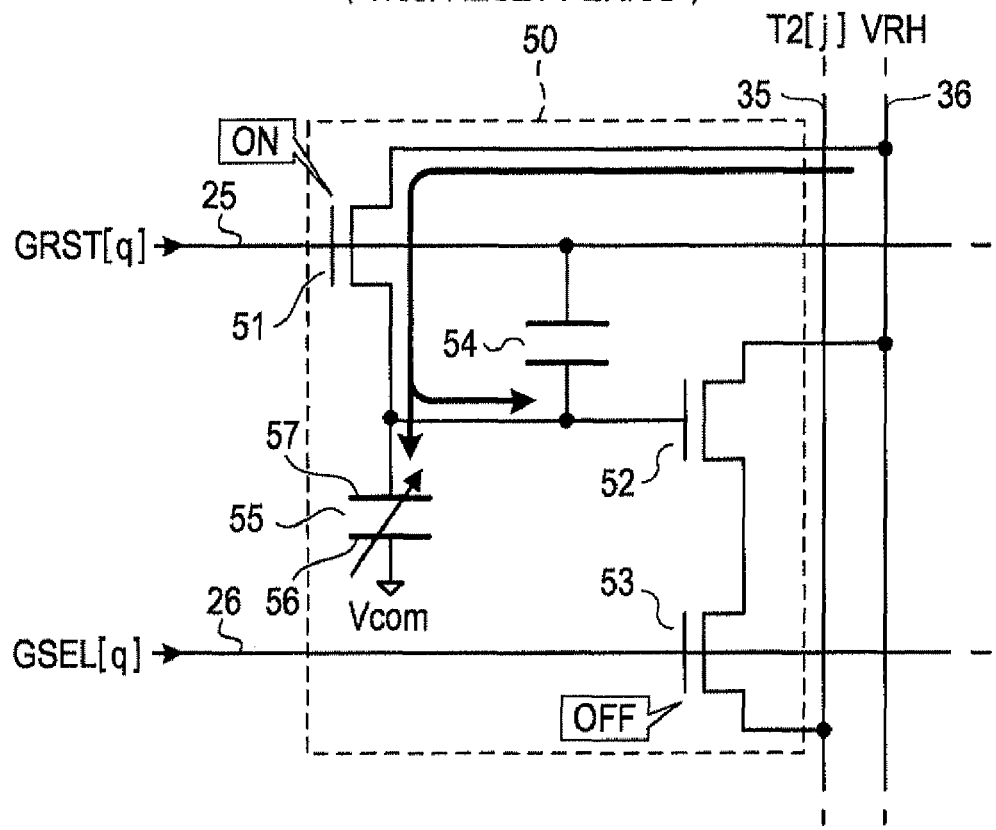
FIG. 9 is a timing chart showing the operation of the capacitance sensing circuit 50.

As shown in FIG. 8, the capacitance sensing circuit 50 operates in units of the reset period Tres, the sensing period Tsen, and the read-out period Tout. In the reset period Tres, the level of the reset signal GRST[q] that is supplied to the control line 25 becomes the active level, and the selection signal GSEL[q] that is supplied to the measuring scanning line 26 is maintained at the low level. Accordingly, as shown in FIG. 9, during the reset period Tres, the reset transistor 51 is in the ON state, and the selection transistor 53 is in the OFF state. Therefore, the electric potential VA of the gate of the amplification transistor 52 is set (reset) to the power source electric potential VRH. In addition, the power source electric potential VRH is supplied also to the second electrode 57 of the contact measuring capacitance element 55, and a voltage between the first electrode 56 and the second electrode 57 of the contact measuring capacitance element 55 is maintained to be "VRH-Vcom".

Figure 10:
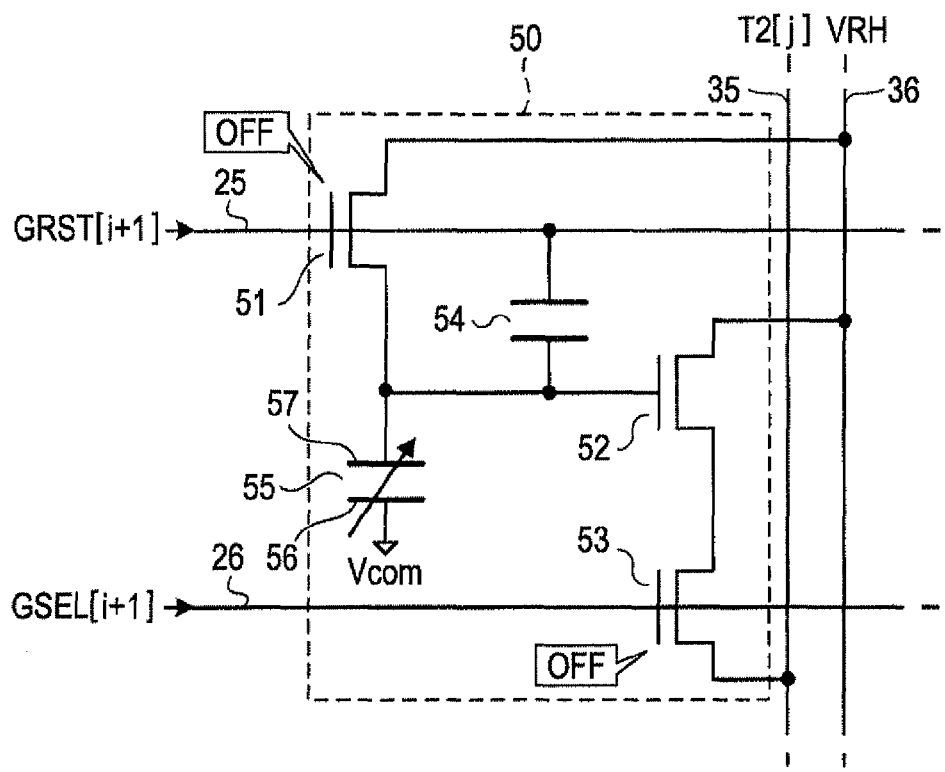
FIG. 10 is a timing chart showing the operation of the capacitance sensing circuit 50.

As shown in FIG. 8, in the sensing period Tsen following the reset period Tres, the level of the reset signal GRST[q] becomes the inactive level, and the selection signal GSEL[q] is maintained at the low level. Accordingly, as shown in FIG. 10, the reset transistor 51 transits to the OFF state, and the selection transistor 53 is maintained in the OFF state. Since the impedance of the gate of the amplification transistor 52 is sufficiently high, the gate is in an electrically floating state during the sensing period Tsen. In addition, one electrode of the reference capacitance element 54 is connected to the control line 25. Thus, when the level of the reset signal GRST[q] that is supplied to the control line 25 changes from the active level to the inactive level, the electric potential VA of the gate of the amplification transistor 52 changes due to capacitive coupling in accordance with the change of the level of the reset signal GRST[q]. The amount of the change of the electric potential VA of the gate at this moment has a value corresponding to the ratio of capacitance of the contact measuring capacitance element 55 to capacitance of the reference capacitance element 54.

Figure 11:
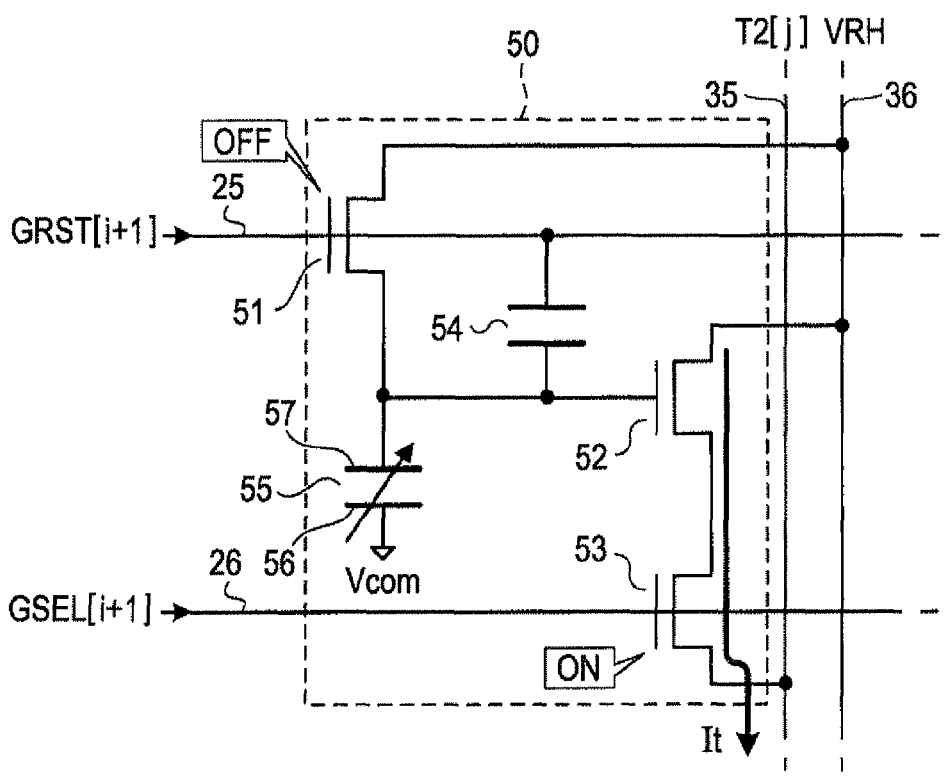
FIG. 11 is a timing chart showing the operation of the capacitance sensing circuit 50.

As shown in FIG. 8, in the read-out period Tout following the sensing period Tsen, the level of the selection signal GSEL[q] becomes the high level. Accordingly, as shown in FIG. 11, the reset transistor 51 is maintained in the OFF state, and the selection transistor 53 transits to the ON state. Therefore, a current It having amplitude corresponding to the electric potential VA of the gate of the amplification transistor 52 flows through the sense line 35 so as to be supplied to the read-out circuit 30. Accordingly, the capacitance measuring signal T2[j] is output.

During the sensing period Tsen, when a target object contacts the contact surface, the capacitance value of the contact measuring capacitance element 55 changes. When the capacitance value of the contact measuring capacitance element 55 changes, the electric potential VA of the gate of the amplification transistor 52 changes in accordance with the change in the capacitance value. Accordingly, there is a difference between a level of the capacitance measuring signal T2[j] that is output for a case where the target object does not contact the contact surface and a level of the capacitance measuring signal T2[j] that is output for a case where the target object contacts the contact surface. Such property is used for detecting a contact and determining a contact position.

When the capacitance value of the contact measuring capacitance element 55 in a state in which a target object is not in contact with the contact surface is denoted by C1c, the amount of change of the capacitance value of the contact measuring capacitance element 55 at a time when a target object is in contact with the contact surface is denoted by ΔC1c, the capacitance value of the reference capacitance element 54 is denoted by Cref, and a change of the electric potential of the control line 25 is denoted by ΔV (=VD), the amount of change ΔVA of the electric potential VA of the gate of the amplification transistor 52 at a time when the target object is in contact with the contact surface is represented by the following Equation (1). In Equation (1), parasitic capacitance is ignored.

$$\Delta VA = \{(Cref \times \Delta C1c) \times \Delta V\} / \{(Cref + C1c + \Delta C1c)(Cref + C1c)\}$$ Equation (1)

Figure 12:
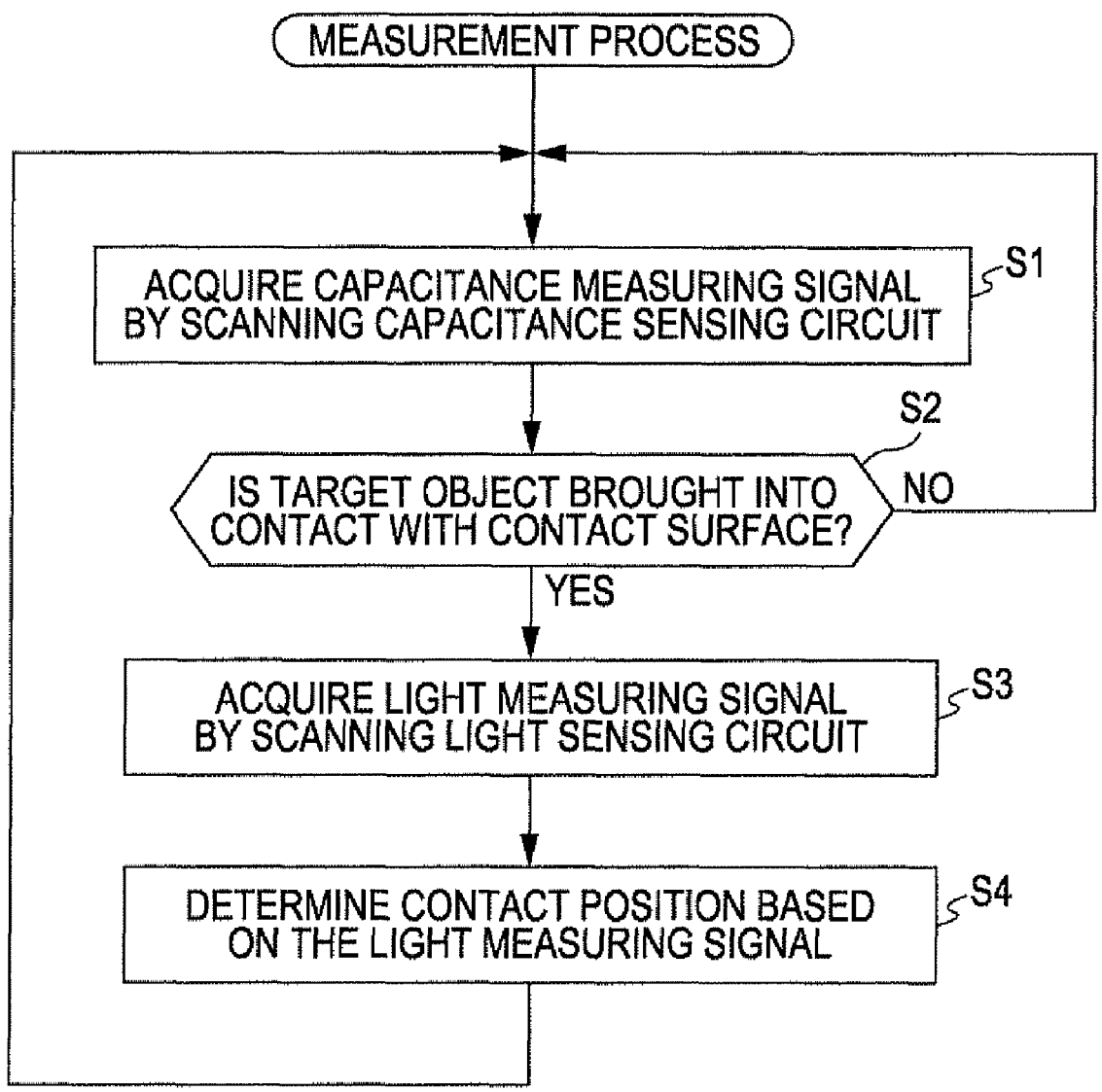
FIG. 12 is a flowchart showing an operation of a control circuit 500 of the touch panel 1.

FIG. 12 is a flowchart showing an operation of the control circuit 500. As shown in FIG. 12, the control circuit 500, first, controls the measuring scanning line driving circuit 20 (in particular, the capacitance shift register 21) so as to perform a capacitance scanning operation (scanning the capacitance sensing circuits 50), and whereby acquiring the capacitance measuring signals T2[j] from the capacitance sensing circuits 50 of m/2 rows×n columns through the read-out circuit 30 (Step S1). At this moment, a light scanning operation (scanning the light sensing circuits 40) is not performed. Accordingly, when the capacitance sensing circuits are disposed in even rows as in this embodiment, row selection is made not for odd rows but for even rows.

Then, the control circuit 500 determines whether a target object is in contact with the contact surface based on the acquired capacitance measuring signals T2[j] (Step S2). In other words, a change from a non-contact state of the target object on the contact surface to a contact state of the target object is detected by using an electrostatic capacitance method. Although a detailed description will be followed as below, an optical method is not appropriate for detecting a contact. On the other hand, according to this embodiment, a contact detecting operation is performed by using the electrostatic capacitance method as described above, and therefore contact of the target object can be detected with high accuracy.

In the determination process of Step S2, when a determination condition is not satisfied, that is, when a target object is in a non-contact state for the contact surface, the process returns to Step S1, and the control circuit 500 repeats the processes of Steps S1 and S2. On the other hand, when the determination condition is satisfied in the determination process of Step S2, the process proceeds to Step S3. In Step S3, the control circuit 500 controls the measuring scanning line driving circuit 20 (in particular, the light shift register 22) so as to perform a light scanning operation, and whereby acquiring the light measuring signals T1[j] from the light sensing circuits 40 of m/2 rows×n columns through the read-out circuit 30 (Step S3). At this moment, a capacitance scanning operation is not performed. Accordingly, when the light sensing circuits are disposed in odd rows, as in this embodiment, row selection is made not for even rows but for odd rows.

Thereafter, the control circuit 500 determines a contact position of the target object on the contact surface based on the acquired light measuring signals T1[j] (Step S4). In other words, determining a contact position is performed by using an optical method. Although a detailed description will be followed as below, an electrostatic capacitance method is not appropriate to determining a contact position. On the other hand, according to this embodiment, a contact position determining operation is performed by using the optical method as described above, and therefore a contact position of the target object can be determined with high accuracy.

Then, when the process of Step S4 is completed, the process returns to Step S1, and the control circuit 500 resumes the process. Thus, according to this embodiment, a contact detecting operation using an electrostatic capacitance method and a contact position determining operation using an optical method are repeated as long as the target object is in contact with the contact surface. In other words, contact is detected by using the electrostatic capacitance method all the time.

As described above, the method of determining a contact position on the touch panel 1 according to this embodiment has combined advantages of the capacitance detecting method and the light detecting method. Accordingly, the contact position of the target object can be determined accurately. In addition, according to this embodiment, the capacitance scanning operation and the light scanning operation are not performed together. In other words, only necessary functions are performed, and thereby power consumption of the touch panel 1 can be reduced. Hereinafter, the touch panel 1 will be described in detail.

Figure 13:
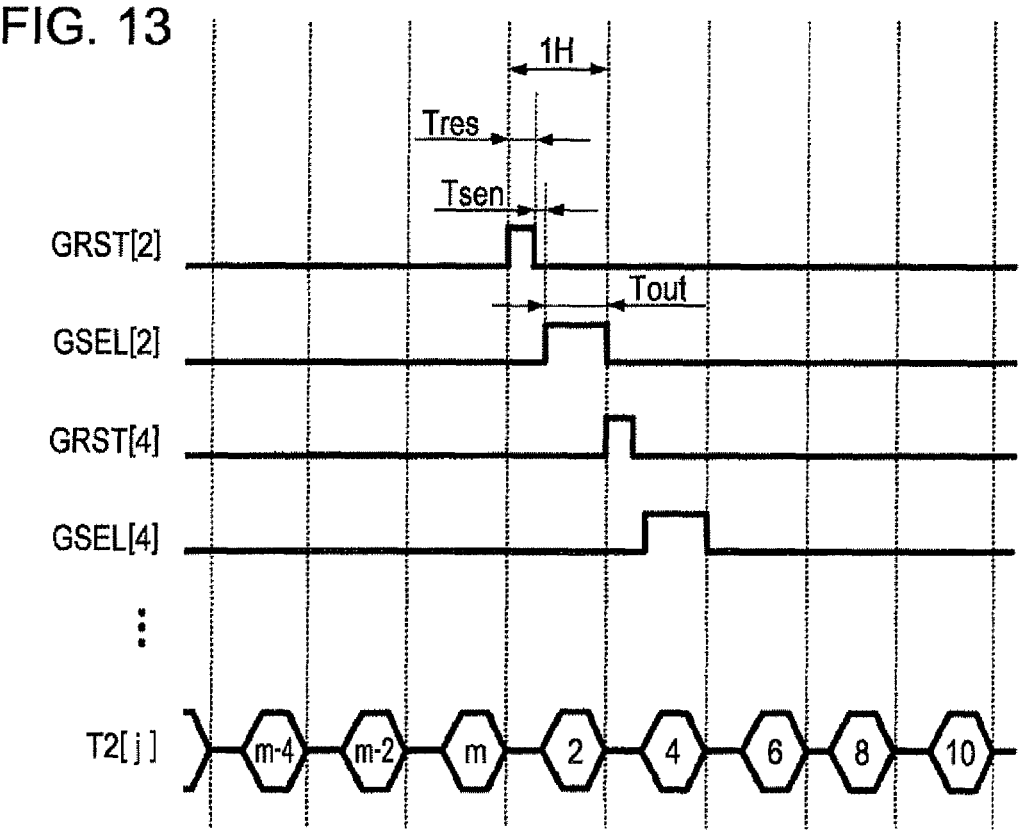
FIG. 13 is a timing chart showing the operation (the capacitance scanning operation) of the touch panel 1.

FIG. 13 is a timing chart showing the operation (the capacitance scanning operation) of the touch panel 1.

As shown in FIG. 13, in the capacitance scanning operation, when a horizontal scanning period is reached, the level of the reset signal GRST[2] that is supplied to the capacitance sensing circuit 50 of the second row from the control line 25 of the second row becomes the active level, and accordingly, the capacitance sensing circuit 50 of the second row reaches the reset period Tres. Then, in this horizontal scanning period, the level of the reset signal GRST[2] becomes the inactive level, and the capacitance sensing circuit 50 of the second row reaches the sensing period Tsen. Then, the level of the selection signal GSEL[2] that is supplied from the measuring scanning line 26 of the second row to the capacitance sensing circuit 50 of the second row transits from the low level to the high level, and the capacitance sensing circuit 50 of the second row reaches the read-out period Tout. Then, as this horizontal scanning period ends, the level of the selection signal GSEL[2] transits to the low level, and this read-out period Tout is completed. In this read-out period Tout, the amplitudes of the capacitance measuring signals T2[j] that are supplied to the read-out circuit 30 through n sense lines 35 from the capacitance sensing circuit 50 of the second row have values corresponding to the capacitance values of the contact measuring capacitance elements 55 of the capacitance sensing circuit 50.

When a next horizontal scanning period is reached, the level of the reset signal GRST[4] that is supplied to the capacitance sensing circuits 50 of the fourth row from the control line 25 of the fourth row becomes the active level, and the capacitance sensing circuits 50 of the fourth row reach the reset period Tres. Then, during this horizontal scanning period, the level of the reset signal GRST[4] becomes the inactive level, and the capacitance sensing circuits 50 of the fourth row reach the sensing period Tsen. Then, the level of the selection signal GSEL[4] that is supplied from the measuring scanning line 26 of the fourth row to the capacitance sensing circuits 50 of the fourth row transits from the low level to the high level, and the capacitance sensing circuits 50 of the fourth row reaches the read-out period Tout. Then, as this horizontal scanning period ends, the level of the selection signal GSEL[4] transits to the low level, and this read-out period Tout is completed. In this read-out period Tout, the amplitudes of the capacitance measuring signals T2[j] that are supplied to the read-out circuit 30 through n sense lines 35 from the capacitance sensing circuits 50 of the fourth row have values corresponding to the capacitance values of the contact measuring capacitance elements 55 of each capacitance sensing circuit 50.

As described above, in the capacitance scanning operation, the capacitance sensing circuits 50 of even rows sequentially reach a series of cycles (the reset period Tres, the sensing period Tsen, and the read-out period Tout) for each horizontal scanning period. In addition, the amplitudes of the capacitance measuring signals T2[j] that are supplied to the read-out circuit 30 become values corresponding to the capacitance values of the contact measuring capacitance elements 55 of the capacitance sensing circuit 50 that reaches the read-out period. The length of the sensing period Tsen shown in the figure is merely an example. However, it is preferable that the sensing period Tsen is long enough to allow the amplitudes of the capacitance measuring signals T2[j] transmitted from the capacitance sensing circuit 50 to have values corresponding to the capacitance values of the contact measuring capacitance elements 55 of the capacitance sensing circuit 50. The length of the sensing period Tsen can be changed by changing the start period of the selection signal GSEL[q].

Figure 14:
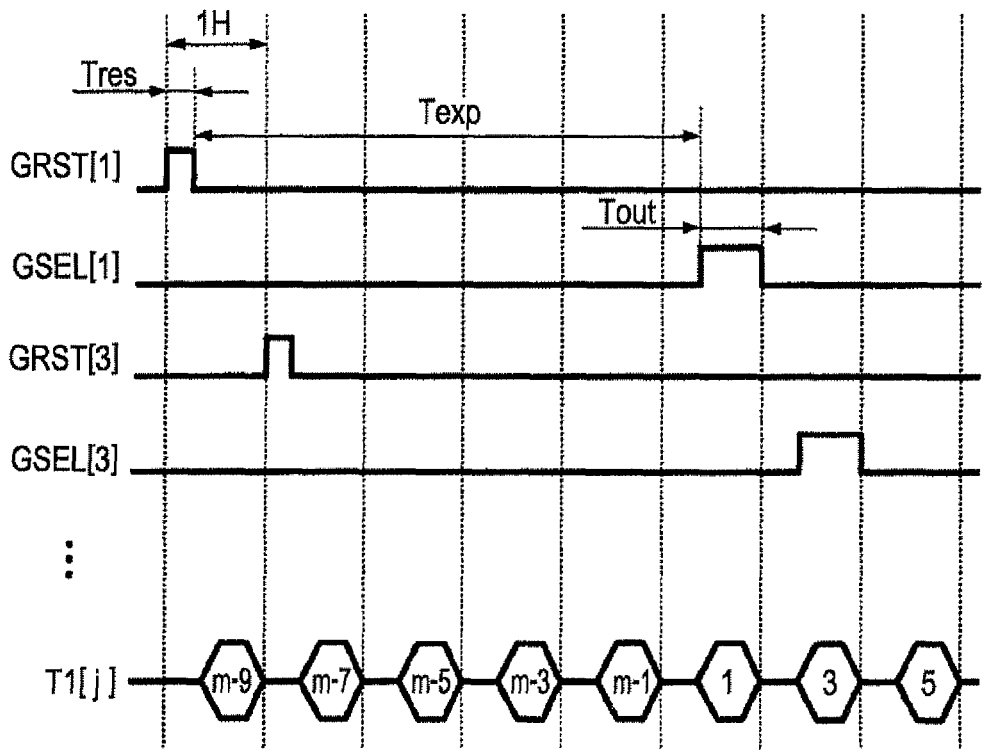
FIG. 14 is a timing chart showing the operation (light scanning operation) of the touch panel 1.

FIG. 14 is a timing chart showing the operation (light scanning operation) of the touch panel 1.

As shown in FIG. 14, in the light scanning operation, when a horizontal scanning period (1H) is reached, the level of the reset signal GRST[1] that is supplied from the control line 25 of the first row to the light sensing circuits 40 of the first row becomes the active level, and the light sensing circuits 40 of the first row reach the reset period Tres. Then, during this horizontal scanning period, the level of the reset signal GRST [1] becomes the inactive level, and the light sensing circuits 40 of the first row reach the exposure period Texp.

When a next horizontal scanning period is reached, the level of the reset signal GRST[3] that is supplied to the light sensing circuits 40 of the third row from the control line 25 of the third row becomes the active level, and the light sensing circuits 40 of the third row reach the reset period Tres. Then, during this horizontal scanning period, the level of the reset signal GRST[3] becomes the inactive level, and the light sensing circuits 40 of the third row reach the exposure period Texp.

Thereafter, in the horizontal scanning period, the level of the selection signal GSEL[1] that is supplied from the measuring scanning line 26 of the first row to the light sensing circuits 40 of the first row transits from the low level to the high level, and the light sensing circuits 40 of the first row reach the read-out period Tout. Then, as this horizontal scanning period ends, the level of the selection signal GSEL[1] transits to the low level, and this read-out period Tout is completed. In this read-out period Tout, the amplitudes of the light measuring signals T1[j] that are supplied to the read-out circuit 30 through n sense lines 35 from the light sensing circuits 40 of the first row have values corresponding to the light intensities of light incident to the photo diodes 45 of each light sensing circuit 40.

Then, during a next horizontal scanning period, the level of the selection signal GSEL[3] that is supplied from the measuring scanning line 26 of the third row to the light sensing circuits 40 of the third row transits from the low level to the high level, and the light sensing circuits 40 of the third row reach the read-out period Tout. Then, as this horizontal scanning period ends, the level of the selection signal GSEL[3] transits to the low level, and this read-out period Tout is completed. In this read-out period Tout, the amplitudes of the light measuring signals T1[j] that are supplied to the read-out circuit 30 through n sense lines 35 from the light sensing circuits 40 of the third row have values corresponding to the light intensities of light incident to the photo diodes 45 of each light sensing circuit 40.

As described above, in the light scanning operation, the light sensing circuits 40 of odd rows sequentially reach a series of cycles (the reset period Tres, the exposure period Texp, and the read-out period Tout) for each horizontal scanning period. In addition, the amplitudes of the light measuring signals T1[j] that are supplied to the read-out circuit 30 become values corresponding to the light intensities of light incident to the photo diodes 45 of the light sensing circuit 40 that reaches the read-out period. The length of the exposure period Texp shown in the figure is merely an example. However, it is preferable that the exposure period Texp is long enough to allow the amplitudes of the light measuring signals T1[j] transmitted from the light sensing circuit 40 to have values corresponding to the light intensities of light incident to the photo diodes 45 of each light sensing circuit 40. The length of the exposure period Texp can be changed by changing the start period of the selection signal GSEL[p].

Figure 15:
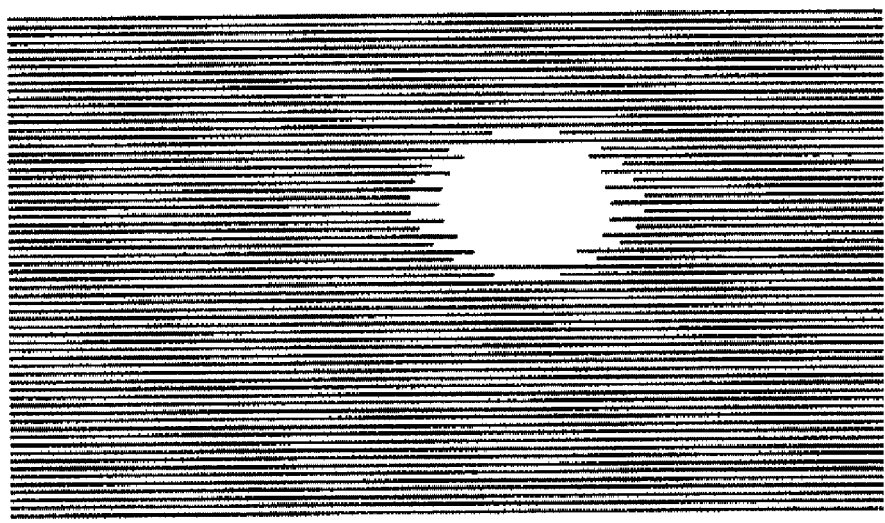
FIG. 15 is a schematic diagram showing an example of a capacitance image that can be acquired by the touch panel 1.
Figure 16:
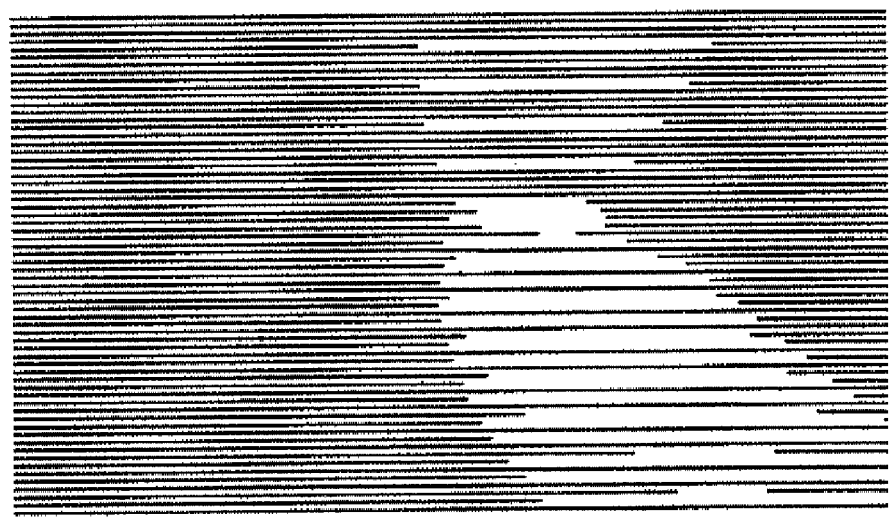
FIG. 16 is a schematic diagram showing an example of a binarized capacitance image that can be acquired by the touch panel 1.

In the control circuit 500, an image shown in FIG. 15 can be acquired from capacitance scanning frames based on the capacitance measuring signals T2[j] transmitted from the capacitance sensing circuit 50 of m/2 rows×n columns (Step S1 shown in FIG. 12). In other words, an image having an area (near the center in the figure) including a spot with which a target object is in contact to be bright and an area to be darkened as the area is located farther from the above-described area can be acquired. The control circuit 500 determines an area (capacitance area) that includes a spot with which the target object is in contact by binarizing the image (the capacitance measuring signals T2[j]) based on a predetermined threshold value (reference level). In this binarization process, for example, values of pixels in the capacitance area are "1"s, and values of other pixels are "0"s. An example of a binarized capacitance image is schematically shown in FIG. 16.

Figure 17:
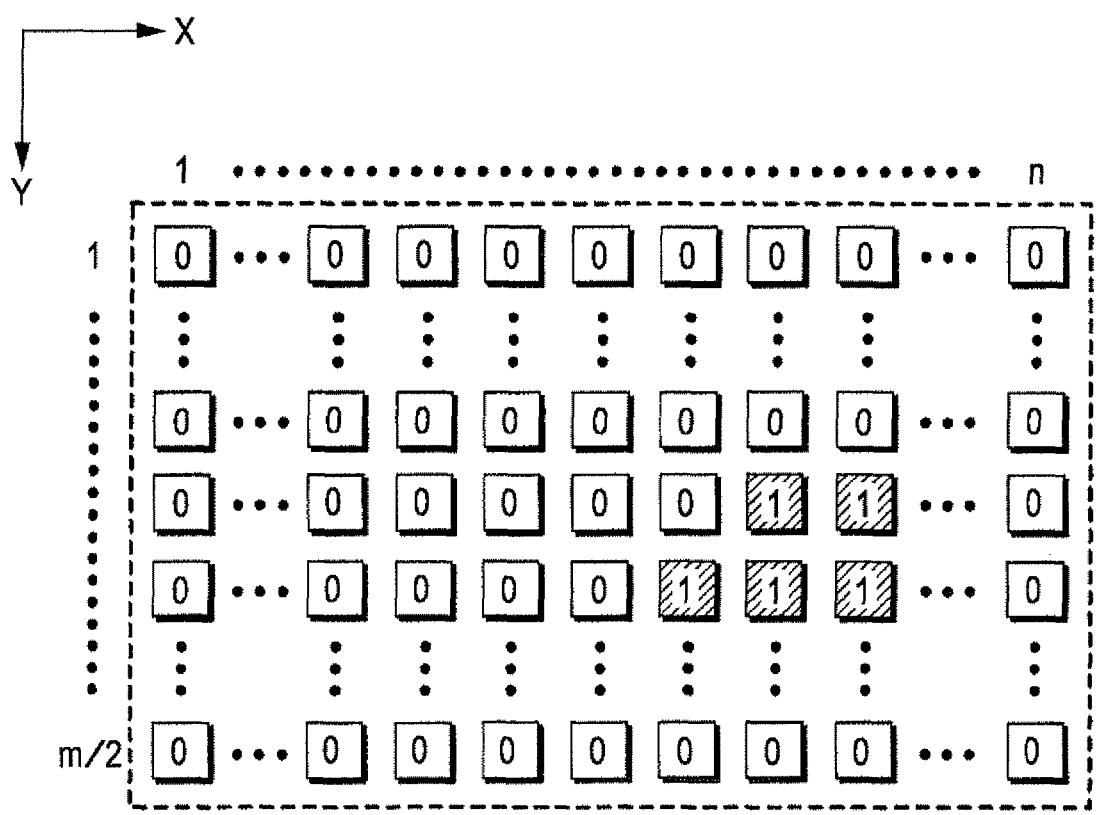
FIG. 17 is a schematic diagram showing an example of a light image that can be acquired by the touch panel 1.

In addition, in the control circuit 500, an image shown in FIG. 17 can be acquired from capacitance scanning frames based on the light measuring signals T1[j] transmitted from the light sensing circuit 40 of m/2 rows×columns (Step S3 shown in FIG. 12). The control circuit 500 determines an area (light area) that includes a spot with which the target object is in contact or a close spot by binarizing the image (the light measuring signals T1[j]) based on a predetermined threshold value (reference level). In this binarization process, for example, values of pixels in the light area are "1"s, and values of other pixels are "0"s. In addition, in FIG. 17, for the convenience of drawing, a bright portion is drawn to be thick, and a dark portion is drawn to be thin. However, an image (light image) in which an area (near the center portion in the figure) that includes a spot with which the target object is in contact or a spot close to the target object is dark, and an area that is brighter as the area is located farther from the above-described area can be acquired actually.

As is apparent from FIGS. 15 and 17, commonly, a capacitance area is wider than a light area. This trend is prominent particularly when there is a plurality of contact spots. The reason is that, in a case where there is a plurality of contact spots, the first substrate or the second substrate can be easily bent in a wide range among the plurality of contact spots. In the worst case, one capacitance area may include a plurality of contact spots. Commonly, the accuracy of detection of contact of the touch panel 1 with a target object for a case where detection is performed by using a capacitance image is higher than that for a case where detection is performed by using a light image. The reason is as follows. When detection is performed by using a light image, a target object may be determined to be in contact with the touch panel even for a case where the target object is closely located without being in actual contact with the touch panel. However, when detection is performed by using a capacitance image, such a detection error cannot occur.

As described above, the touch panel 1 includes the first substrate and the second substrate that face each other, the dielectric material that is pinched by both the substrates, a plurality of the measuring scanning lines 26 that extends along both the substrates between both the substrates, and a plurality of the capacitance sensing circuits 50 and a plurality of the light sensing circuits 40 that are arranged on a face along both the substrates between both the substrates. In the touch panel 1, the light sensing circuits 40 of the j-th row are connected to the measuring scanning line 26 that is not connected to any of the plurality of the capacitance sensing circuits 50 and output light measuring signals T1[j] having amplitudes corresponding to the light intensities of incident light. In addition, in the touch panel 1, the capacitance sensing circuits 50 of the j-th row are connected to the measuring scanning line 26 that is not connected to any of the plurality of the light sensing circuits 40 and include the contact measuring capacitance elements 55 that have the dielectric material, the first electrode 56, and the second electrode 57. The capacitance sensing circuits 50 of the j-th row output capacitance measuring signals T2[j] that have amplitudes corresponding to capacitance values of the contact measuring capacitance elements 55.

Accordingly, according to the touch panel 1, a contact position between a target object and a display device can be determined accurately based on the measuring signals. In addition, according to the touch panel 1, row section of one time is selection of only the light sensing circuits 40 or selection of only the capacitance sensing circuits 50. Accordingly, output signals of sensors that are selected by row selection of one time are either only the light measuring signals T1 or only the capacitance measuring signals T2, and therefore data processing in circuits of later stages can be simplified.

In addition, the touch panel 1 includes a plurality of the sense lines 35 that extends between the first substrate and the second substrate along both the substrates. To the sense lines 35, the capacitance sensing circuits 50 and the light sensing circuits 40 are connected. In other words, in the touch panel 1, the sense lines 35 are commonly used for the capacitance sensing circuits 50 and the light sensing circuits 40. Thus, according to the touch panel 1, for example, the aperture ratios of the light sensing circuit 91 and the pixel circuit 11 can be increased.

In addition, in the touch panel 1, as described above, a jump scanning method is used for each scanning operation. In other words, among the sensing circuits, only a total of m/2 rows×n columns of the capacitance sensing circuits 50 are driven in the capacitance scanning operation, and only a total of m/2 rows×n columns of the light sensing circuits 40 are driven in the light scanning operation. Accordingly, a light image that is based on only the light measuring signals T1[j] that are output from the light sensing circuits 40 and a capacitance image that is based on only the capacitance measuring signals T2[j] that are output from the capacitance sensing circuits 50 can be acquired in an easy manner. As a result, according to the touch panel 1, data processing in circuits of later stages is simplified.

In addition, as a method combining advantages of the optical type and the electrostatic capacitance type, a configuration in which the contact measuring capacitance elements are included in the light sensing circuits 40, and the contact measuring capacitance elements are connected to the photo diodes 45 in parallel or a configuration in which photo diodes are included in the capacitance sensing circuit 50, and the photo diodes are connected to the contact measuring capacitance elements 55 in parallel may be considered to be used. However, in such configurations, there are unsolved problems such as difficulty in implementing a reset operation or a remarkable decrease in the output current of the photo diode, compared to the output current of the contact measuring capacitance element. To the contrary, in the touch panel 1, the light sensing circuits and the capacitance sensing circuits are separately disposed, and accordingly, there are no such disadvantages.

Second Embodiment

Figure 18:
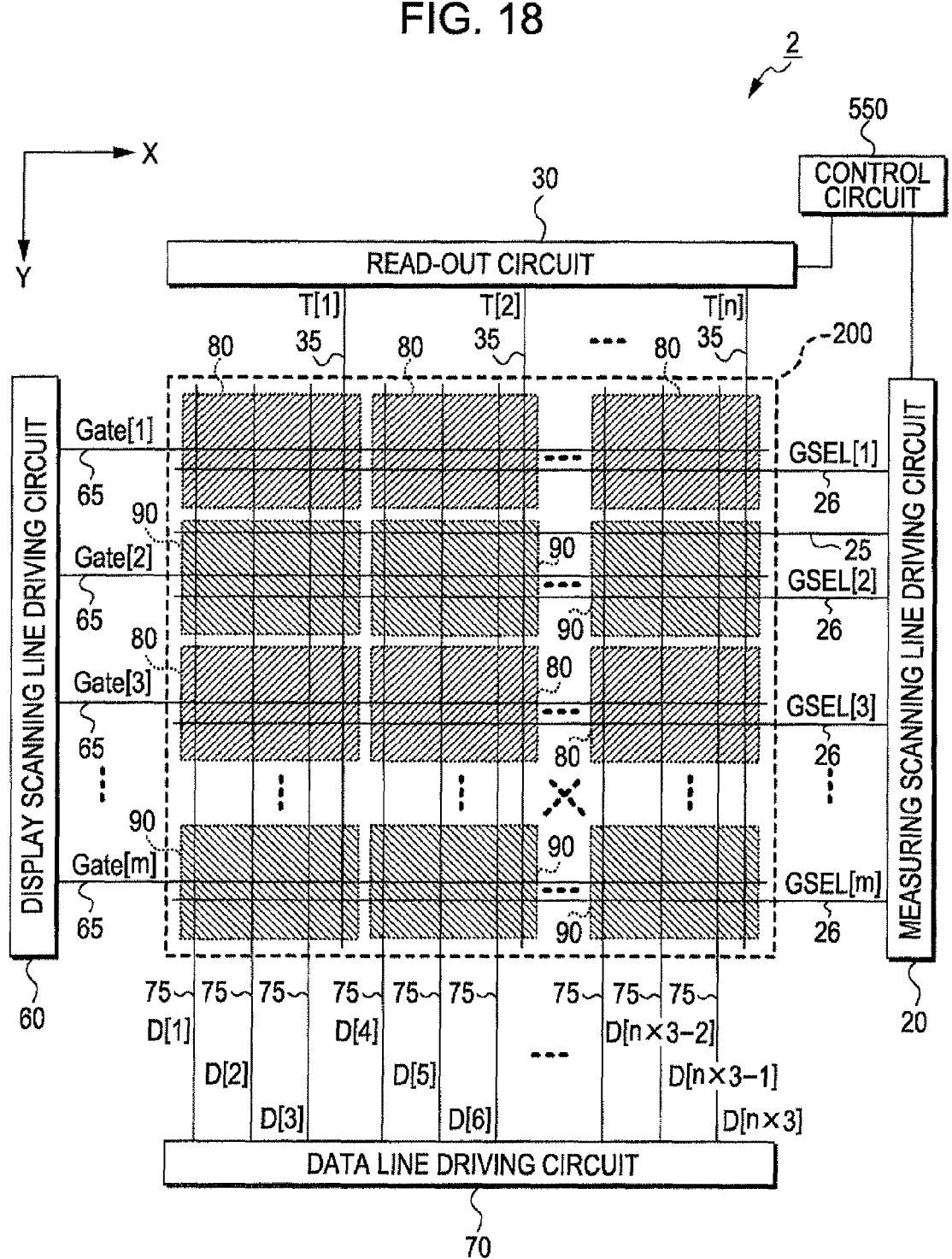
FIG. 18 is a block diagram showing the configuration of a display device 2 according to a second embodiment of the invention.

FIG. 18 is a block diagram showing the configuration of a display device (electronic apparatus) 2 according to a second embodiment of the invention. The display device 2 is so-called a transmissive-type liquid crystal display device. A big difference between the display device 2 and the touch panel 1 is that a display circuit is included in addition to the sensor in the display device 2. In particular, the display device 2 includes a display and measurement area 200 in which a plurality of unit circuits (a plurality of unit circuits 80 and a plurality of unit circuits 90) is arranged in a face shape instead of the measurement area 100, a control circuit 550 instead of the control circuit 500, a display scanning line driving circuit 60 and a data line driving circuit 70 that drive each unit circuit, and a back light not shown in the figure. In this embodiment, a screen becomes the contact surface.

The back light is disposed on the back face side of the display and measurement area 200. The "back face" of the display and measurement area 200 is a face opposite to the contact surface. Thus, when an outer face of a first substrate is the contact surface, an outer face of a second substrate is the back face. In the display device 2, both the first substrate and the second substrate are formed of transparent materials, and thus, the above-described dielectric material is limited to a liquid crystal. In addition, the plurality of unit circuits is arranged in a face shape between the first substrate and the second substrate along the first substrate and the second substrate.

As shown in FIG. 18, in the display and measurement area 200, same as in the measurement area 100, m measuring scanning lines 26 that extend in direction X and n sense lines 35 that extend in direction Y are disposed. The unit circuits, same as the sensors of the touch panel 1, are disposed in positions corresponding to intersections of the measuring scanning lines 26 and the sense lines 35 so as to be arranged in the shape of a matrix of vertical m rows×horizontal n columns. In addition, in the display and measurement area 200, m display scanning lines 65 that extend in direction X and "n×3" data lines 75 that extend in direction Y are disposed. The unit circuits are also disposed in positions corresponding to intersections of the display scanning lines 65 and bundles of the data lines 75 that are formed in units of three data lines 75.

The display scanning line driving circuit 60 repeatedly performs a process of sequentially selecting the display scanning lines 65 for every vertical scanning period (1V) by sequentially setting scanning signals Gate[i] that are output to m display scanning lines 63 to an active level for every horizontal scanning period (1H). The data line driving circuit 70 outputs data signals D[u] (here, u=1 to n×3) that are in correspondence with pixel circuits 11 (to be described later) of one row corresponding to the display scanning line 65 that is selected by the display scanning line driving circuit 60 to the data lines 75. The data line D[u] has an electric potential corresponding to a gray scale that is designated to a corresponding pixel circuit 11 (to be described later).

As described above, in this embodiment, 1 V=1 H×m. Thus, in capacitance scanning, the measuring scanning line driving circuit 20 sequentially selects the measuring scanning lines 26 by sequentially setting the scanning signals GSEL[q] that are output to m/2 measuring scanning lines 26 to the active level for each 2 H in one-row jumping manner. In addition, in light scanning, the measuring scanning line driving circuit 20 sequentially selects the measuring scanning lines 26 by sequentially setting the scanning signals GSEL[p] that are output to m/2 measuring scanning lines 26 to the active level for each 2 H in one-row jumping manner.

The plurality of unit circuits 80 is disposed in positions corresponding to intersections of the measuring scanning lines 26 of odd rows and the sense lines 35 (intersections of the display scanning lines 65 of odd rows and bundles of the data lines 75 in units of three data lines 75). On the other hand, the plurality of unit circuits 90 is disposed in positions corresponding to intersections of the measuring scanning lines 26 of even rows and the sense lines 35 (intersections of the display scanning lines 65 of even rows and bundles of the data lines 75 in units of three data lines 75).

Figure 19:
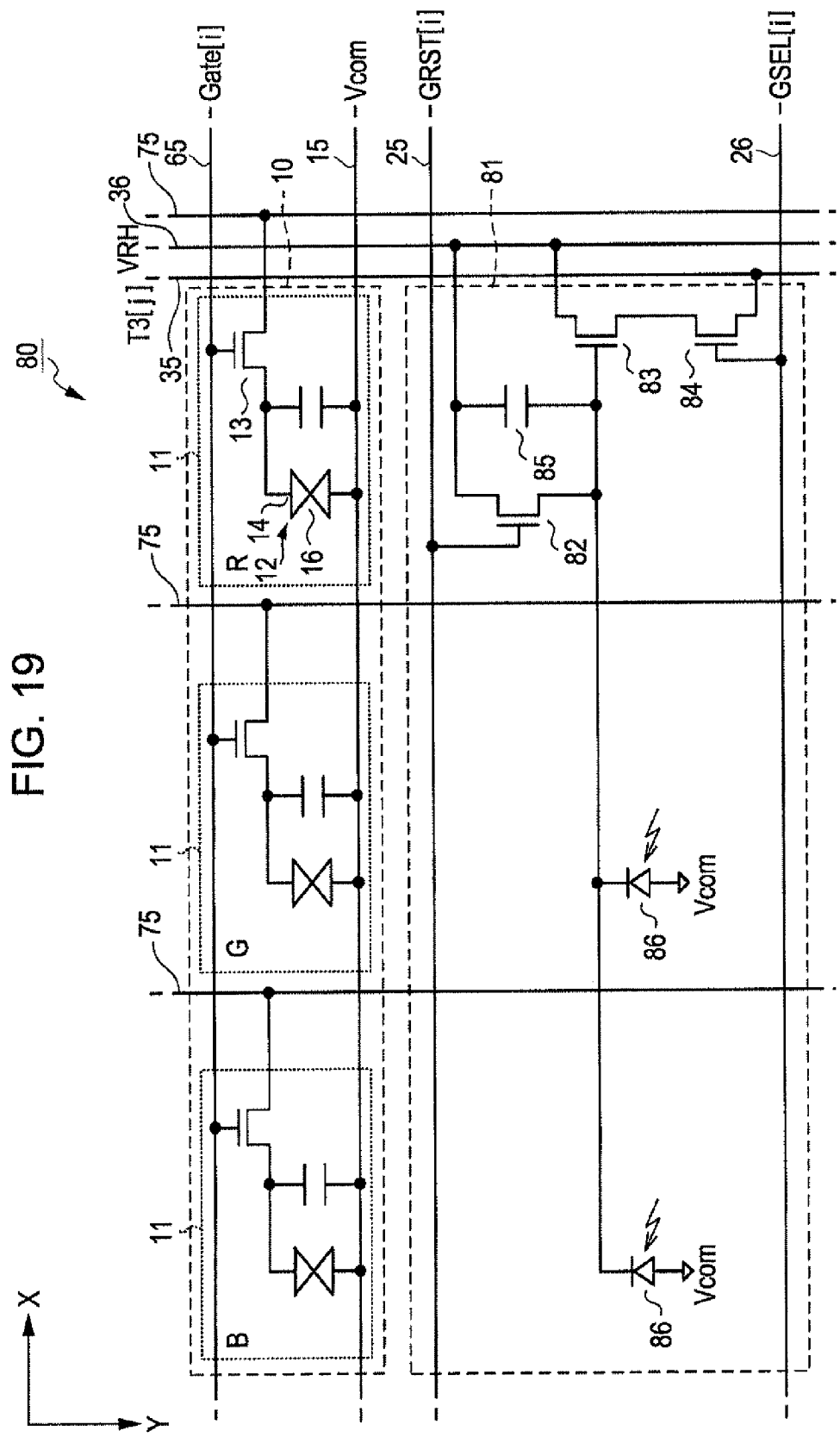
FIG. 19 is a circuit diagram showing the configuration of a unit circuit 80 of the display device 2.

As shown in FIG. 19, each unit circuit 80 has one display unit circuit 10 and one light sensing circuit 81. The display unit circuit 10 has one set of the pixel circuits 11. In one set of the pixel circuits 11, one pixel circuit is a pixel (R pixel) of a display color of R (red color), another pixel circuit is a pixel (G pixel) of a display color of G, and the other one pixel circuit is a pixel (B pixel) of a display color of B (blue color). One set of the pixel circuits 11 is arranged in direction X, and the pixel circuits 11 are disposed in positions corresponding to intersections of the display scanning lines 65 and the data lines 75.

The pixel circuit 11 includes a liquid crystal element 12 and a transistor 13. The liquid crystal element 12 is configured by a pixel electrode 14, a common electrode 15, and a liquid crystal 16 to which an electric field generated between the pixel electrode 14 and the common electrode 15 is applied. The liquid crystal 16 is a part of the liquid crystal that is pinched between the first substrate and the second substrate. In this embodiment, a horizontal electric field-type in which alignment of the liquid crystal 16 is controlled by using a horizontal electric field generated between the pixel electrode 12 and the common electrode 15 is employed. However, a different type may be employed.

To the common electrode 15, a common electric potential Vcom is supplied. The transistor 13 is configured by an N-channel type TFT (thin film transistor). The transistor 13 is interposed between the pixel electrode 14 and the data line 75 and controls a conductive state between the pixel electrode 14 and the data line 75. The gate of the transistor 13 is connected to the display scanning line 65. Thus, when the display scanning line 65 of the i-th row is selected, the transistors 13 of the pixel circuits 11 in the i-th row are in the ON state. Among the pixel circuits 11, a data signal D[u] is supplied from the data line 75 to the pixel electrode 12 of the pixel circuit 11 in the u-th row.

When the electric potential of the data signal D[u] supplied to the pixel electrode 12 of the pixel circuit 11 of the i-th row and the u-th column is assumed to be VD, a voltage value of "VD-Vcom" is applied between the pixel electrode 14 of the pixel circuit 11 and the common electrode 15 thereof in accordance with the supply of the data signal. In other words, light transmittance (a ratio of the amount of light transmitted to the observation side to light emitted from the back light to the liquid crystal element 12) of the liquid crystal element 16 of each pixel circuit 11 changes in accordance with the electric potential of the supplied data signal.

The light sensing circuit 81 reads out a light measuring signal T3[j] having an amplitude corresponding to the light intensity of light incident to a photo diode 86 to be described later and outputs the light measuring signal to the read-out circuit 30. In addition, the light sensing circuit 81 has a configuration same as that of the light sensing circuit 40. The light sensing circuit 81 includes a reset transistor 82 corresponding to the reset transistor 41, an amplification transistor 83 corresponding to the amplification transistor 42, a selection transistor 84 corresponding to the selection transistor 43, a reference capacitance element 85 corresponding to the reference capacitance element 44, and the photo diode 86 corresponding to the photo diode 45. The number of the photo diodes 86 that are included in one light sensing circuit 81 is two. Most of light incident to the photo diode 86 is emitted from the back light so as to be reflected from the target object.

Between two photo diodes 86 that are included in one light sensing circuit 81, one is disposed near the pixel circuit 11 of the G pixel, and the other is disposed near the pixel circuit 11 of the B pixel. The cathodes of two photo diodes 86 described above are connected to the gate of the amplification transistor 83. The reason why the photo diode 86 is not disposed near the pixel circuit 11 of the R pixel is that elements such as the amplification transistor 83 and the reference capacitance element 85 are disposed near the pixel circuit 11 of the R pixel.

Figure 20:
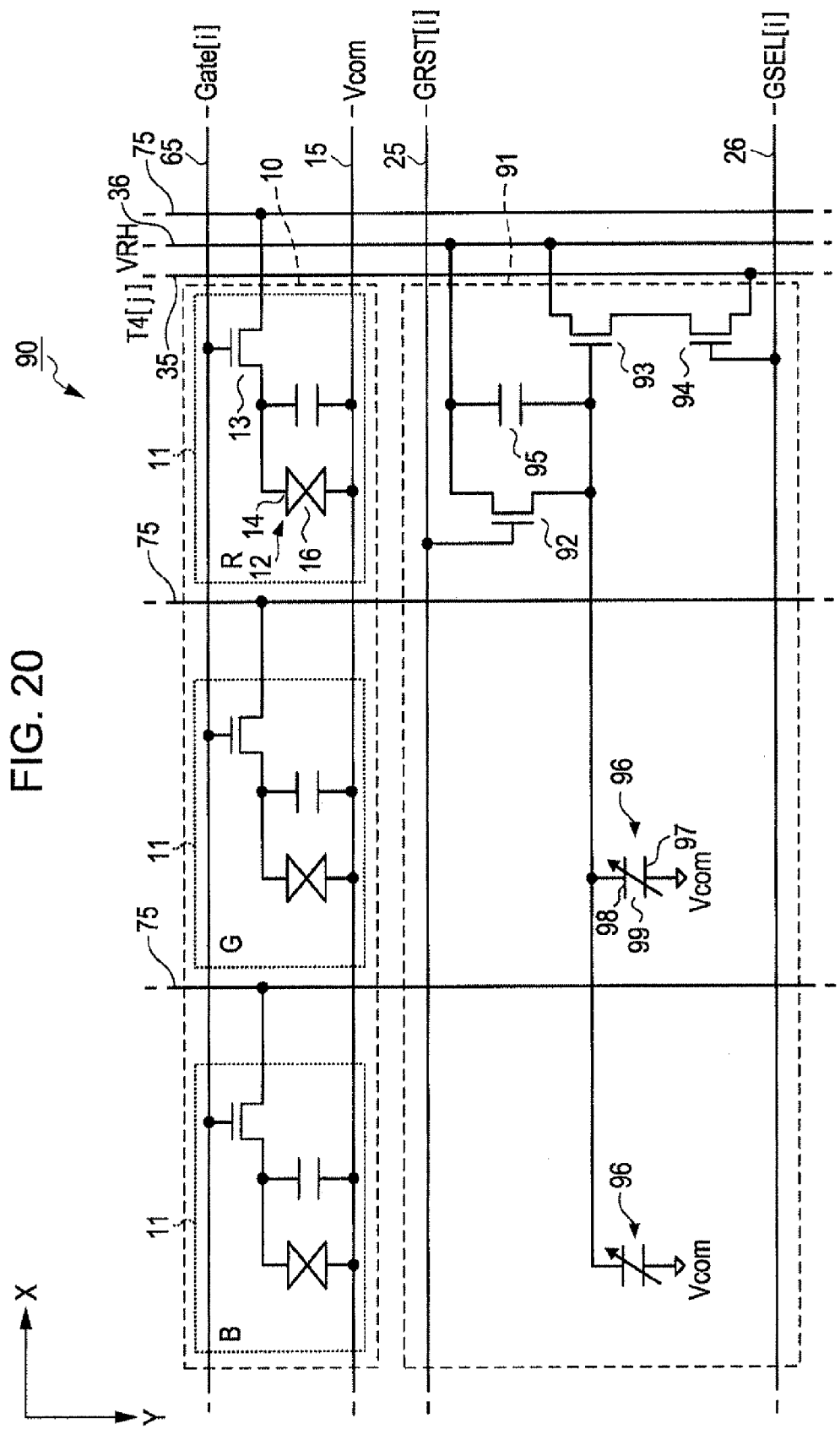
FIG. 20 is a circuit diagram showing the configuration of a unit circuit 90 of the display device 2.

As shown in FIG. 20, the unit circuit 90 has one display unit circuit 10 and one capacitance sensing circuit 91. Since the display unit circuit 10 has one set of the pixel circuits 11 as described above, m×n×3 pixel circuits 11 are arranged between the first substrate and the second substrate along the first substrate and the second substrate in the display device 2. In addition, as described above, the unit circuits of m rows×n columns are arranged between the first substrate and the second substrate along the first substrate and the second substrate, and accordingly, the sensors of m rows×n columns are arranged between both the substrates along both the substrates.

The capacitance sensing circuit 91 reads out a capacitance measuring signal T4[j] having an amplitude corresponding to the capacitance value of a contact measuring capacitance element 96 to be described later and outputs the capacitance measuring signal to the read-out circuit 30. In addition, the capacitance sensing circuit 91 has a configuration same as that of the capacitance sensing circuit 50. Accordingly, in the display device 2, n light sensing circuits 81 are connected to each of the measuring scanning lines 26 of odd rows, and any unit circuit 90 is not connected to the measuring scanning lines 26 of odd rows. In addition, n capacitance sensing circuits 91 are connected to each of the measuring scanning lines 26 of even rows, and any unit circuit 80 is not connected to the measuring scanning lines 26 of even rows. In addition, m/2 light sensing circuits 81 and m/2 capacitance sensing circuits 91 that form a same row are connected to n sense lines 35.

In addition, the capacitance sensing circuit 91 includes a reset transistor 92 corresponding to the reset transistor 51, an amplification transistor 93 corresponding to the amplification transistor 52, a selection transistor 94 corresponding to the selection transistor 53, a reference capacitance element 95 corresponding to the reference capacitance element 54, and a contact measuring capacitance element 96 corresponding to the contact measuring capacitance element 55. The number of the contact measuring capacitance elements 96 that are included in one capacitance sensing circuit 91 is two.

The contact measuring capacitance element 96 includes a first electrode 97 corresponding to the first electrode 56, a second electrode 98 corresponding to the second electrode 57, and a liquid crystal 99 to which an electric field generated between both the substrates is applied. The liquid crystal 99 is a part of the liquid crystal that is pinched between the first substrate and the second substrate. Between two contact measuring capacitance elements 96 that are included in one capacitance sensing circuit 91, one is disposed near the pixel circuit 11 of the G pixel, and the other is disposed near the pixel circuit 11 of the B pixel. The second electrodes 97 of two contact measuring capacitance elements 96 are connected to the gate of the amplification transistor 93. In addition, the reason why the contact measuring capacitance element 96 is not disposed near the pixel circuit 11 of the R pixel in the light sensing circuit 91 is the same as the reason why the photo diode 86 is not disposed near the pixel circuit 11 of the R pixel.

Figure 21:
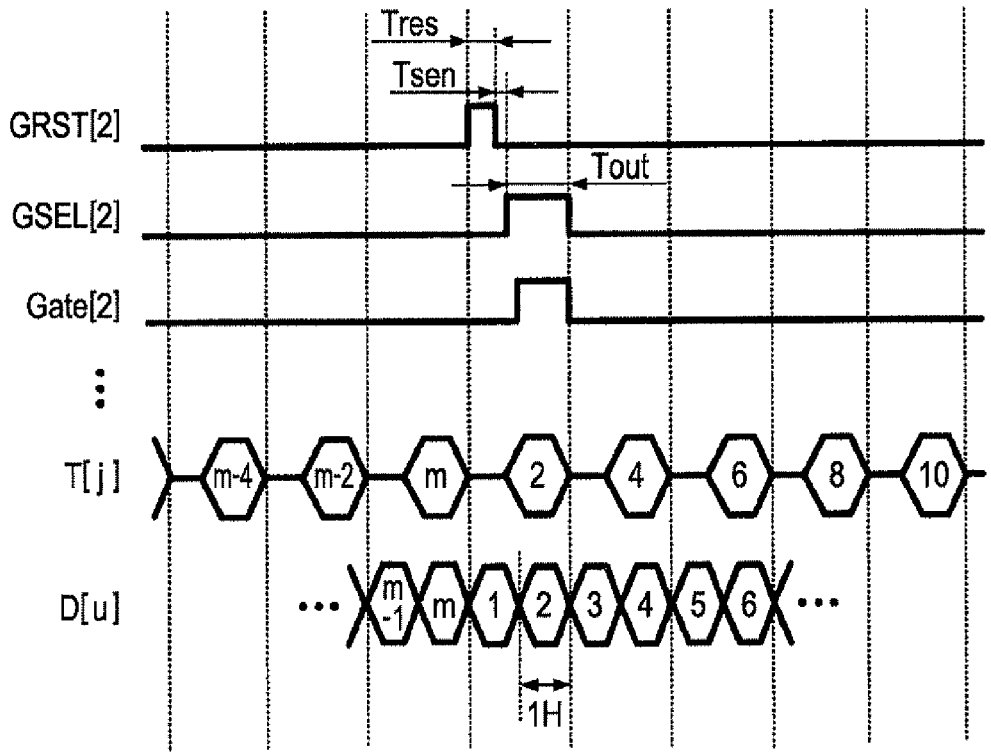
FIG. 21 is a timing chart showing the operation (capacitance scanning operation) of the display device 2.
Figure 22:
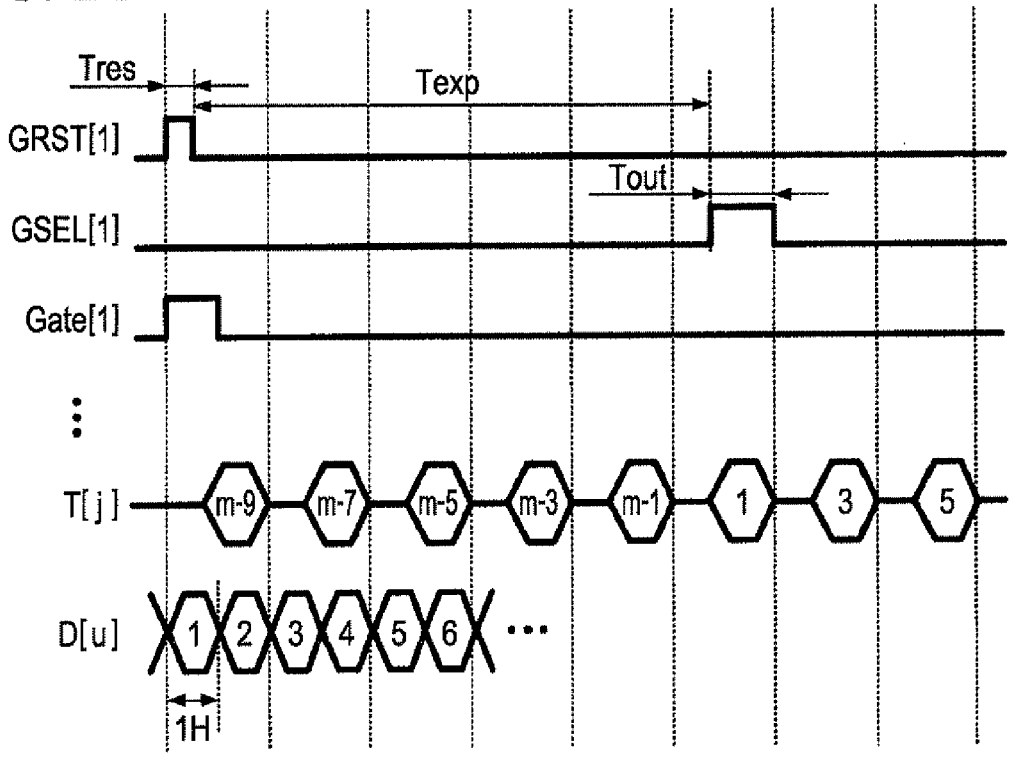
FIG. 22 is a timing chart showing the operation (light scanning operation) of the display device 2.

FIG. 21 is a timing chart showing the operation (capacitance scanning operation) of the display device 2. As shown in FIG. 21, when a horizontal scanning period (1H) is reached, the level of the scanning signal Gate[1] that is supplied to n×3 pixel circuits 11 of the first row from the display scanning lines 65 of the first row becomes the active level. Accordingly, the transistor 13 of the pixel circuit 11 is in the ON state. Thus, a data signal (for example, a data signal D[u]) is supplied from the data line 75 corresponding to the pixel electrode 12 of each pixel circuit 11 (for example, the pixel circuit 11 of the u-th row). Therefore, the light transmittance of the liquid crystal element 16 of each pixel circuit 11 is in correspondence with the electric potential of the supplied data signal. The level of the scanning signal Gate[1] becomes the inactive level when this horizontal period (1 H) elapses.

Thereafter, for every horizontal scanning period, the level of the scanning signal Gate[i] of the display scanning line 65 of the next row (the i-th row) changes as described above. Then, when a vertical scanning period (1 V) elapses, the level of the scanning signal Gate[m] becomes the inactive level, and a display process for one frame is completed. Then, when the next horizontal period is reached, the level of the scanning signal Gate[1] becomes the active level again, and a display process of the next frame is started.

The light scanning operation and the capacitance scanning operation are performed in the same manner as in the first embodiment. However, a time interval of selection of a row for each scanning operation is 2 H. The process performed by the control circuit 550 is the same as that performed by the control circuit 500. However, according to this embodiment, most of light incident to the photo diode 86 is light that is emitted from the back light and reflected from the target object, and accordingly, relationship of contrasting density shown in FIG. 17 represents actual relationship of brightness and darkness correctly. The process performed by the control circuit 550 is determined based on the relationship of the contrasting density and the time interval of row selection of 2 H.

As is clear from the description above, the display device 2 has advantages that are the same as those of the touch panel 1. In addition, the display device 2 may be used as a liquid crystal display device in which a touch panel is built. In other words, not only the pixel circuit 11 but also the light sensing circuit 81 and the capacitance sensing circuit 91 are disposed between the first and second substrates that pinch the liquid crystal. Therefore, according to the display device 2, a decrease in the thickness of the device can be implemented in an easy manner, compared to a case where the touch panel is disposed on the outer side of the liquid crystal display panel.

Third Embodiment

Figure 23:
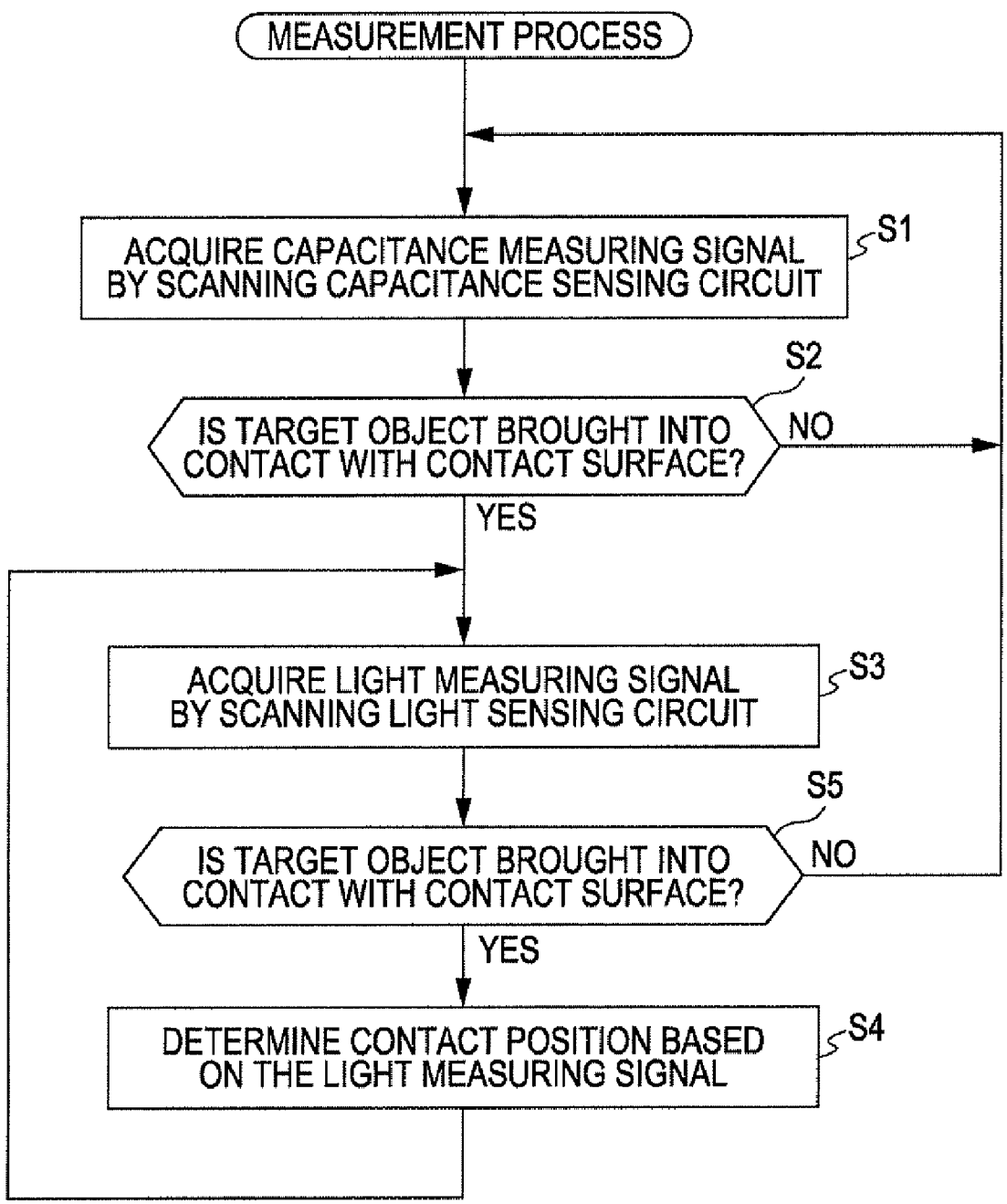
FIG. 23 is a flowchart showing the operation of a control circuit of an electronic apparatus according to a third embodiment of the invention.

FIG. 23 is a flowchart showing the operation of a control circuit of an electronic apparatus according to a third embodiment of the invention. The only difference between this electronic apparatus and the display device 2 is the method of determining the contact position. A difference between the method of determining the contact position shown in FIG. 23 and the method of determining the contact position shown in FIG. 12 is that Step S5 is provided between Step S3 and Step S4 in the method of determining the contact position shown in FIG. 23. In Step S5, it is determined whether the target object is in contact with the contact surface based on the light measuring signals acquired in Step S3 by the control circuit of this electronic apparatus.

In particular, the light measuring signal and the reference level are compared, and it is determined that the target object is in a non-contact state with the contact surface based on the result of comparison. For example, when the levels of the light measuring signals represent a non-contact state for all the light sensing circuits, the determination condition may be determined positively. Alternatively, the determination condition may be determined positively for a case where the levels of the light measuring signals represent a non-contact state of the target object with the screen for a predetermined number of the light sensing circuits. Here, it is preferable that the predetermined number is determined in accordance with the size and the like of an object that is considered as the target object.

According to this embodiment, a change from a non-contact state of the target object to a contact state can be detected by using the light detecting method.

Fourth Embodiment

Figure 24:
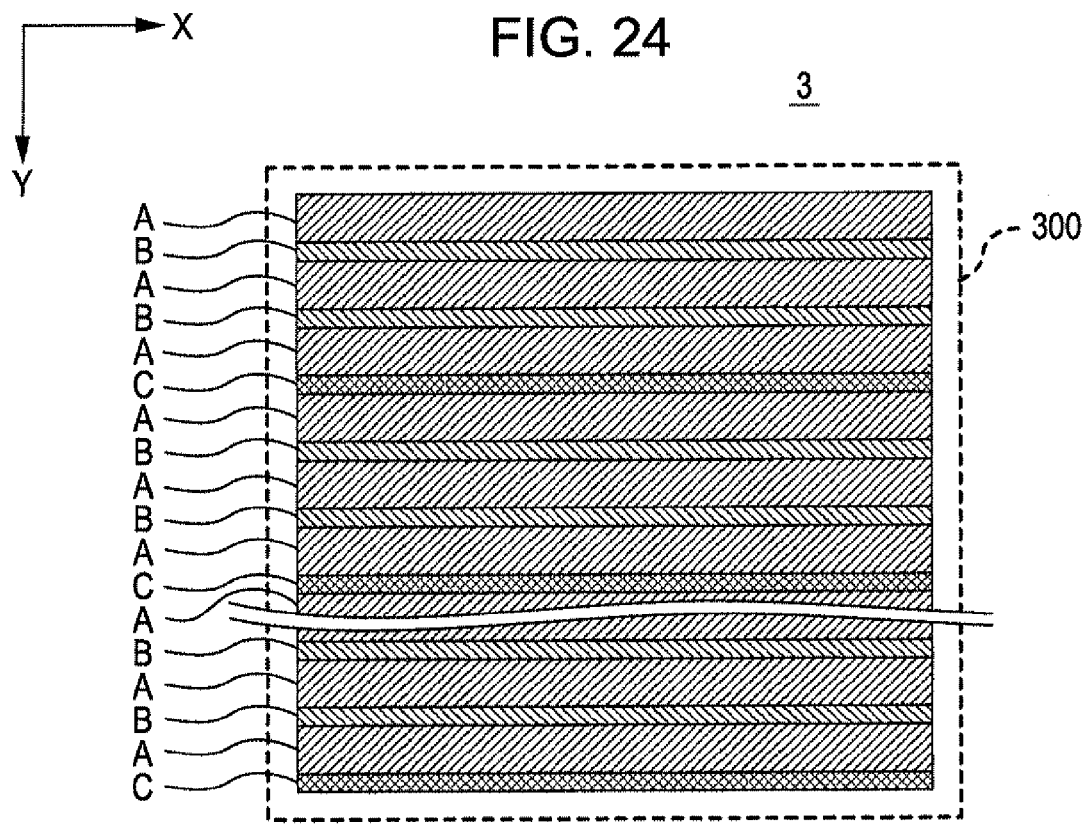
FIG. 24 is a schematic diagram showing the aspect of a display device 3 according to a fourth embodiment of the invention.

FIG. 24 is a schematic diagram showing the aspect of a display device 3 according to a fourth embodiment of the invention. A big difference between the display device 3 and the display device 2 is that a display and measurement area 300 is included instead of the display and measurement area 200 in the display device 3. When a row in which the pixel circuits are aligned is a "display row", a row in which the light sensing circuits are aligned is a "light row", a row in which the capacitance sensing circuits are aligned is a "capacitance row", and a row in which the light sensing circuits or the capacitance sensing circuits are aligned is a "sensor row", one display row and one sensor row are alternately disposed in the display and measurement area 200. However, a plurality of the display rows and one sensor row are disposed alternately in the display and measurement area 300. An area in which the plurality of the display rows is disposed is a display area A in the figure. In addition, while the light row and the capacitance row are alternately disposed in the display and measurement area 200, in the display and measurement area 300, the light row is disposed at the ratio of three rows to two rows, and the capacitance row is disposed at the ratio of three rows to one row. An area in which the light row is disposed is a light area B in the figure, and an area in which the capacitance row is disposed is a capacitance area C in the figure.

As described above, commonly, the capacitance area is wider than the light area. In addition, in the display device 3, same as in the display device 2, the contact position is detected by using not only a binarized capacitance image but also a binarized light image. Accordingly, even in a case where the accuracy of determining the capacitance area is decreased, when the accuracy of detecting the contact can be acquired, the final accuracy of determining the contact position is scarcely decreased. On the other hand, when the number of the light sensing circuits is increased by increasing the density of the light rows on the contact surface, the accuracy of determining the light contacting area is increased. Therefore, the final accuracy of determining the contact position is increased. As above, in this embodiment, the above-described configuration is employed.

In addition, according to this embodiment, in order to acquire the accuracy of detecting existence of contact, the capacitance rows are disposed at a distance of a diameter or a minor axis of the contact range of the target object. The diameter or the minor axis of the contact range of a target object is different in accordance with the target object. For example, for a case where the target object is a human's finger, the diameter of the contact range of the target object is about 5 mm. In such a case, when the pixel pitch is 0.1 mm, one capacitance row is disposed for about 50 display rows. It is apparent that a configuration in which one capacitance row is disposed for less display rows may be used.

According to this embodiment, advantages that are the same as those of the second embodiment can be acquired. In addition, according to this embodiment, the accuracy of determination of the contact position is improved. Furthermore, according to this embodiment, the number of the light rows is larger than the number of the capacitance rows, and the number of the light sensing circuits is larger than the number of the capacitance sensing circuits. Accordingly, the resolution of determination of the contact position is improved, compared to other cases. In addition, it is preferable that the number of stages of the capacitance shift registers is smaller than that of the light shift registers. In such a case, the power consumption for repeating acquiring the capacitance measuring signals by controlling the capacitance shift registers (Step S1) and determining whether the target object is in contact with the contact surface (Step S2) can be reduced.

In addition, according to this embodiment, the measuring scanning line driving circuit 20, the read-out circuit 30, and the control circuit 550 of the display device 2 are changed so as to be used. Any change that is not clear from the above description may be determined appropriately. As this embodiment can be acquired by changing the second embodiment, the same change may be applied to the first embodiment or the third embodiment.

Modified Examples

The invention is not limited to the above-described embodiments, and, for example, the following modifications can be made. In addition, among the modified examples described below, two or more modified examples may be combined together.

According to each of the above-described embodiments, the capacitance sensing circuits and the light sensing circuits are pinched by one common pair of the substrates. However, by modifying the configuration, the light sensing circuits may be disposed on the outer side of one pair of substrates that pinches the capacitance sensing circuits. Alternatively, a device for performing the capacitance scanning operation and a device for performing the light scanning operation may be separately formed, and determination of the contact position may be performed by combining both devices.

In addition, by modifying the first embodiment, a configuration in which a back light is disposed on the back side of the measurement area 100, and the light intensity of light that is emitted from this back light and is reflected from the target object so as to be incident to the photo diode 45 in the light sensing circuit 40 is mainly measured may be used. Under such a configuration, same as in the second embodiment, both the first substrate and the second substrate need to be formed of transparent materials such as glass.

The first and second embodiments may be modified such that the plurality of the measuring scanning lines 26 extends along any one between the first substrate and the second substrate, and the plurality of the sensors (unit circuits) is arranged along any one of both the substrates. Similarly, n sense lines 35 may be configured to extend along any one between both the substrates.

In the second embodiment, a configuration in which the photo diode 86 or the contact measuring capacitance element 96 is not disposed near the pixel circuit 11 of the R pixel is employed. However, the invention is not limited thereto. For example, a configuration in which elements such as the amplification transistor 83 or the reference capacitance elements 85 are disposed in different positions, and the photo diode 86 or the contact measuring capacitance element 96 is disposed near the pixel circuit 11 of the R pixel may be employed. In addition, a configuration in which one light sensing circuit (or one capacitance sensing circuit) has one photo diode 86 (or the contact measuring capacitance element 96) may be employed. Furthermore, a configuration in which one light sensing circuit (or the capacitance sensing circuit) has three or more photo diodes 86 (or the contact measuring capacitance elements 96) may be employed.

According to the second embodiment, one sensor is disposed for one set of the pixel circuit 11 of the R pixel, the pixel circuit 11 of the G pixel, and the pixel circuit 11 of the B pixel. However, the invention is not limited thereto. For example, a sensor may be disposed for each pixel (dot), or one sensor may be disposed for one set of four pixels or more, or a display device for black and white display may be used. In addition, by modifying the second embodiment, so-called a reflective-type liquid crystal display device may be used.

In the second to fourth embodiments, the start period of the reset period Tres is necessarily the start period of 1 H. However, by modifying the configuration, the reset period Tres may be configured so as to be started at a period other than the start period of 1H. In such a case, the peak of a current consumed in the electronic apparatus can be suppressed.

In addition, by modifying the fourth embodiment, the ratio of the number of the light rows to the number of the capacitance rows may be set to a ratio other than the above-described ratio. However, it is preferable that the ratio of the light rows>the ratio of the capacitance rows, that is, the number of the light sensing circuits>the number of the capacitance sensing circuits. In addition, by modifying the third embodiment, the ratio of the number of the display rows to the number of the sensor rows may be set to a ratio other than the above-described ratio. For example, same as in the first to third embodiments, the display row and the sensor row may be disposed alternately.

Applied Example

Next, an electronic apparatus using the display device according to the first to third embodiments will be described. Hereinafter, the display device according to the first to third embodiments is referred to as a display device 4.

Figure 25:
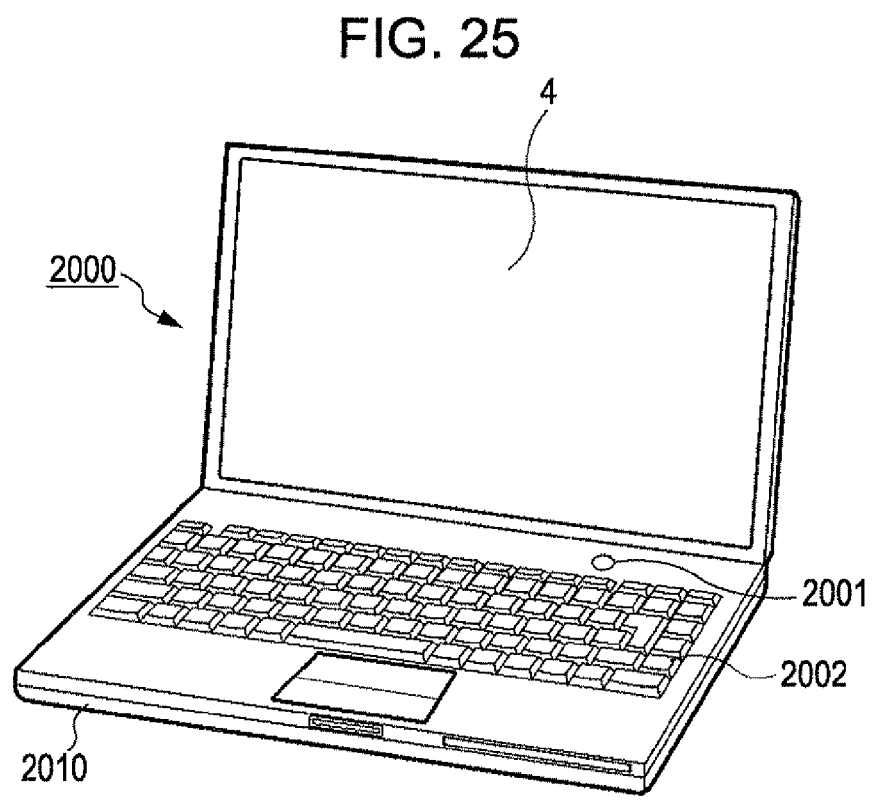
FIG. 25 is a perspective view showing the configuration of a mobile-type personal computer in which the display device 2 or 3 is used.

FIG. 25 shows the configuration of a mobile-type personal computer in which the display device 4 is used. The personal computer 2000 includes the display device 4 and a main body unit 2010. In the main body unit 2010, a power switch 2001 and a keyboard 2002 are disposed.

Figure 26:
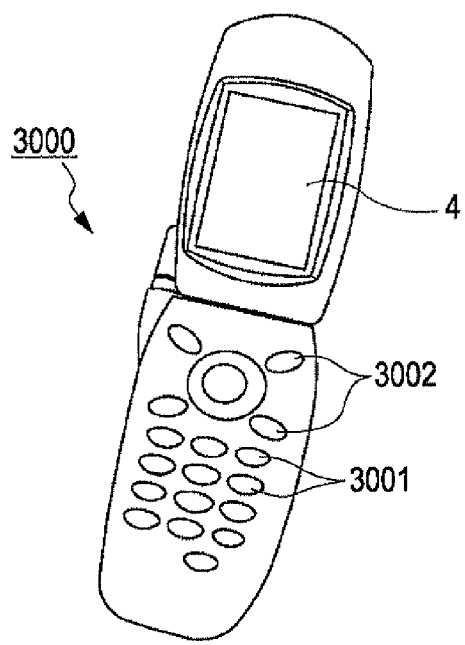
FIG. 26 is a perspective view showing the configuration of a cellular phone in which the display device 2 or 3 is used.

FIG. 26 shows the configuration of a cellular phone in which the display device 4 is used. The cellular phone 3000 includes a plurality of operation buttons 3001, scroll buttons 3002, and the display unit 4. By operating the scroll button 3002, a screen displayed in the display device 4 is scrolled.

Figure 27:
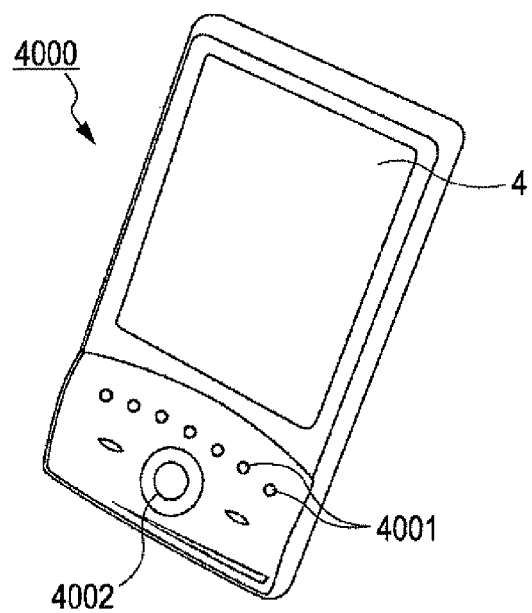
FIG. 27 is a perspective view showing the configuration of a personal digital assistants in which the display device 2 or 3 is used.

FIG. 27 shows the configuration of a personal digital assistants (PDA) in which the display device 4 is used. The personal digital assistants 4000 includes a plurality of operation buttons 4001, a power switch 4002, and the display device 4. By operating the power switch 4002, various types of information such as an address book or a schedule book is displayed in the display unit 4.

As electronic apparatuses to which an embodiment of the invention is applied, there are a digital still camera, a television set, a camcorder, a car navigation equipment, a pager, an electronic organizer, an electronic paper sheet, a calculator, a word processor, a workstation, a video phone, a POS terminal, a printer, a scanner, a copier, and an electronic apparatus that is used as a touch panel of a video player or the like, in addition to the touch panel and the display device.

The entire disclosure of Japanese Patent Application No: 2008-129069, filed May 16, 2008 is expressly incorporated by reference herein.

What is claimed is:

1. A method of determining a contact position in an electronic apparatus including a plurality of capacitance sensing circuits that measures capacitance and a plurality of light sensing circuits that measures light intensities of incident light, the method comprising:

acquiring capacitance measuring signals from the plurality of capacitance sensing circuits by scanning the plurality of capacitance sensing circuits;

determining whether a target object is in contact with a contact surface based on the acquired capacitance measuring signals;

acquiring light measuring signals from the plurality of light sensing circuits by scanning the plurality of light sensing circuits in case that the target object is determined to be in contact with the contact surface in the determining of whether the target object is in contact with the contact surface;

determining whether the target object is distantly positioned from the contact surface based on the acquired light measuring signals after the acquiring of the light measuring signals;

determining a position at the contact surface, with which the target object is in contact, based on the acquired light measuring signals in case that the target object is determined to be in contact with the contact surface in the determining of whether the target object is distantly positioned, wherein, in case that the target object is determined to be distantly positioned from the contact surface in the determining of whether the target object is distantly positioned, the process proceeds to the acquiring of the capacitance measuring signals, the number of light sensing circuits is larger than the number of capacitance sensing circuits, a plurality of display rows, wherein the plurality of light sensing circuits are disposed as a plurality of rows at a ratio of three display rows to two light sensing circuit rows and the plurality of capacitance sensing circuits are disposed as a plurality of rows at a ratio of three display rows to one capacitance sensing circuit row, and a number of stages of capacitance shift registers are smaller than that of a number of light shift registers.

2. The method according to claim 1, wherein the process returns to the acquiring of the capacitance measuring signals when the determining of the position of the contact surface is completed.

3. The method according to claim 1, wherein, the determining of whether the target object is distantly positioned from the contact surface is comparing the light measuring signals with a reference level and determining whether the target object is distantly positioned from the contact surface based on the result of comparison.

4. The method according to claim 1, further comprising:
acquiring the capacitance measuring signals by sequentially scanning the plurality of capacitance sensing circuits without scanning the plurality of light sensing circuits; and
acquiring the light measuring signals by sequentially scanning the plurality of light sensing circuits without scanning the plurality of capacitance sensing circuits.

5. The method according to claim 1,
wherein the acquiring of the capacitance measuring signals and the determining of whether the target object is in contact with the contact surface are mutually repeated until the target object is determined to be in contact with the contact surface in the determining of whether the target object is in contact with the contact surface.

6. The method according to claim 1,
wherein, when the determining of the position of the contact surface is completed, the process returns to the acquiring of the light measuring signals.

* * * * *